United States Patent
Boerner et al.

(10) Patent No.: US 7,664,684 B2
(45) Date of Patent: Feb. 16, 2010

(54) METHOD AND SYSTEM FOR CATCH-WEIGHT MANAGEMENT

(75) Inventors: Stefan Boerner, Ettlingen (DE); Udo K. Laub, Hambruecken (DE); Matthias J. Heinrichs, Speyer (DE); Jochen Hirth, Birkenau (DE)

(73) Assignee: SAP AG, Walldorf (DE)

( * ) Notice: Subject to any disclaimer, the term of this patent is extended or adjusted under 35 U.S.C. 154(b) by 1233 days.

(21) Appl. No.: 10/940,658

(22) Filed: Sep. 15, 2004

(65) Prior Publication Data

US 2006/0085294 A1    Apr. 20, 2006

Related U.S. Application Data

(60) Provisional application No. 60/604,828, filed on Aug. 27, 2004.

(51) Int. Cl.
*G06Q 10/10* (2006.01)
*G06F 17/30* (2006.01)

(52) U.S. Cl. ......................................... 705/28
(58) Field of Classification Search .................. 705/10, 705/28
See application file for complete search history.

(56) References Cited

U.S. PATENT DOCUMENTS

2003/0018513 A1*   1/2003   Hoffman et al. .............. 705/10

* cited by examiner

*Primary Examiner*—F. Zeender
*Assistant Examiner*—Denisse Ortiz Roman
(74) *Attorney, Agent, or Firm*—Kenyon & Kenyon LLP

(57) ABSTRACT

A multiple transaction quantity inventory management system including an inventory management component to store and manage inventory information using a base unit of measure ("UOM") and in a valuation UOM related by at least one conversion factor for each of a plurality of goods; a material management component connected to the inventory management component, the material management component to monitor and maintain information on the plurality of goods in the base UOM and in the valuation UOM for each of the plurality of goods; a sales delivery component connected to the inventory management component, the sales delivery component to receive and process sales orders in the base UOM; a warehouse management component connected to the inventory management component, the warehouse management component to control stock information for the plurality of goods in a single UOM; and a financial component connected to the inventory management component, the material management component, the sales delivery component, and the warehouse management component, the financial component to value movement of the plurality of goods using the valuation UOM.

8 Claims, 9 Drawing Sheets

Units of measure in purchase order

| | Material | Pieces | Kg |
|---|---|---|---|
| 4711 | Side of pork | 12 | 480 |
| 4712 | Shoulder (beef) | 20 | 400 |

Catch weight at goods receipt and in inventory management

| | | | |
|---|---|---|---|
| 4711 | Side of pork | 12 | 512 |
| 4712 | Shoulder (beef) | 20 | 448 |

Invoice verification takes place for the exact weight

FIG. 1

Units of measure in purchase order

| Material | | Pieces | Kg |
|---|---|---|---|
| 4711 | Side of pork | 12 | 480 |
| 4712 | Shoulder (beef) | 20 | 400 |

Catch weight at goods receipt and in inventory management

| 4711 | Side of pork | 12 | 512 |
|---|---|---|---|
| 4712 | Shoulder (beef) | 20 | 448 |

Invoice verification takes place for the exact weight

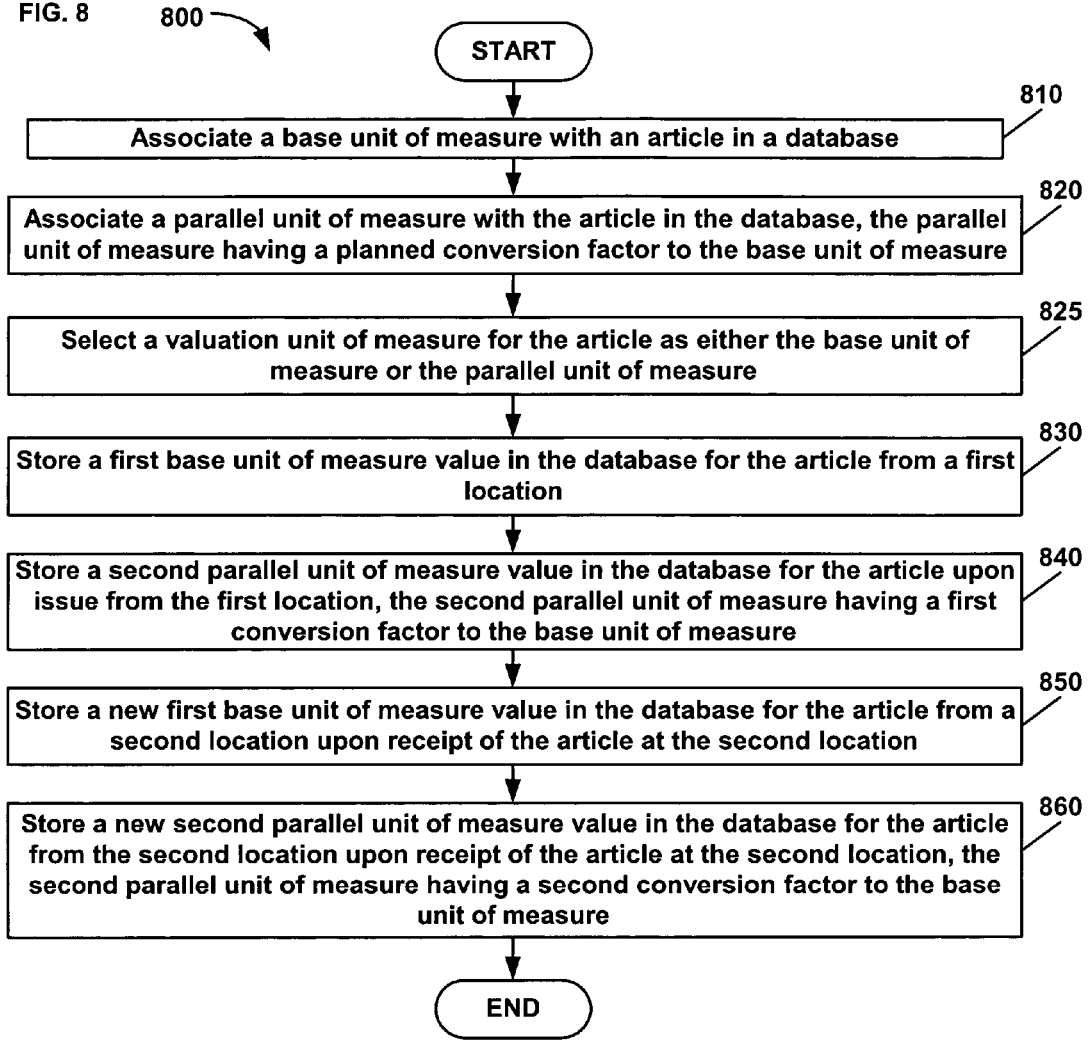

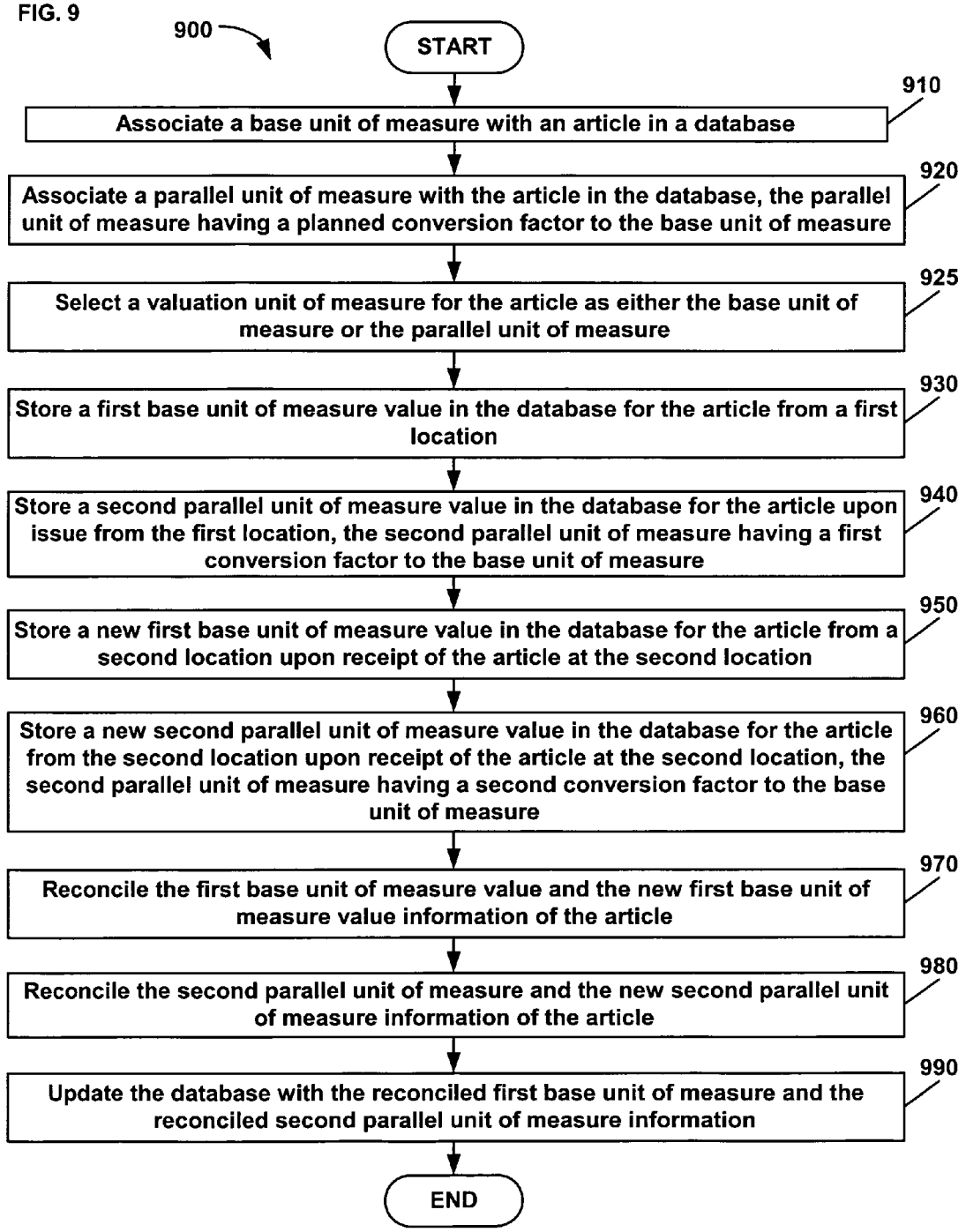

METHOD AND SYSTEM FOR CATCH-WEIGHT MANAGEMENT

CROSS-REFERENCE TO RELATED APPLICATION

This application claims the benefit of priority afforded by provisional application No. 60/604,828 filed Aug. 27, 2004.

FIELD OF THE INVENTION

The field of the invention relates to software applications for catch-weight management and, in particular to methods and systems for the capture and processing of multiple units of measure ("UOMs") with a variable relationship to each other for a single article type.

BACKGROUND

Currently catch-weight articles, in the strict sense, are articles for which there is a variable relationship between a base unit of measure ("UOM") and a parallel UOM. As the relationship between the UOMs is unknown, or can vary every time goods movements are recorded, it is necessary to "catch," i.e., measure, the weight at each recordation. This means that a quantity has to be entered for both the parallel UOM and for the base UOM. This necessitates some form of weighing or measuring before entry. In addition, the fact that the articles could undergo natural shrinkage, such as weight loss during storage, must also be taken into account.

As conversion factors between the base UOM and the parallel UOM are not always fixed, both UOMs have to be updated separately in an inventory management application. The relationships between other alternative UOMs have to be fixed to either the base UOM or the parallel UOM (i.e., pallets (base UOM) to cases (parallel UOM)). Both the base UOM and the parallel UOM can be any UOM and are not restricted to a specific type of UOM (i.e., either UOM can be a volume, or a length, or a weight, etc.).

For certain materials in the Consumer Products ("CP") industry, there is a distinction between a logistic UOM and a valuation UOM. While the logistic UOM is the deciding UOM for all processes in operative logistics (i.e., in every goods handling process), since the planning for and actual movement of the goods is accomplished using the logistic UOM, the valuation and payment flows take place on the basis of the valuation UOM. These materials occur mainly in businesses where non-standardized products are handled. A standardized product is a good where the conversion factor can be standardized, i.e., fixed, for example, for frozen food or standard packaged food, such as: fresh meat (chicken, beef, pork, etc.); some dairy companies that produce fresh cheese (rounds of cheese, etc.); fish industry; and other selected fresh food companies, such as those for fruits and vegetables.

The relationship between logistic and valuation UOM is variable and the logistic UOM is often expressed as pieces, cases or eaches, while the valuation UOM is often in weight UOMs like kilogram ("KG" or "kg") or pounds ("LB" or "lb") are used. In addition, metric UOMs (e.g., length) or volume UOMs might be used as valuation UOMs. Unfortunately, conventional inventory management systems are not capable of dealing with this requirement.

For many materials in the Consumer Products industry, the piece UOM is just as important as the weight UOM. While the piece UOM is the deciding UOM for all processes in operative logistics (that is to say in every goods-handling process, in purchase orders and requests), the valuation and payment flows take place on the basis of the weight UOM. The relationship between the piece UOM and the weight UOM is, however, variable here. The weights, therefore, can vary from piece to piece, either due to biological variations or because of weight loss during transfer and/or storage. This variability should not be lost by using fixed conversion factors, as this would mean that many business processes would be based on incorrect values. If, for example, 100 cases of meat that weigh 950 kg in total are delivered in a goods receipt, the use of a fixed conversion factor of 1:10 would lead to a higher stock quantity in kg than was actually delivered. In a valuation based on kg, the stock value in this example would also be too high.

If kg was used as the base UOM in this example, and the actual quantity of 950 kg was updated, conversion using the fixed conversion factors would lead to a too small number of cases, and rounding errors could also occur. There is an additional problem in the availability check here when the requests are processed in the piece UOM.

For materials with a variable relationship between the UOMs, updating quantities in only one UOM and using fixed conversion factors does not give a definitive display of the actual stocks in each of the different UOMs. Stock control becomes more difficult. Although there are no more cases of meat in the warehouse, for example, quantities can theoretically still be available in kg, as meat and other natural products, such as cheese and fish, lose weight through surface evaporation when stored unpacked. Inventory management only in the weight UOM will always give incorrect quantities. The only reliable stock criterion in this case is the piece UOM. Despite this, the weight UOM is also needed as it is used to value stock, and purchase and sales prices are expressed in monetary UOMs per weight UOM. This is explained in the following example:

100 pieces of cheese with a total weight of 1000 kg (e.g., each piece weighs an average of 1000 kg/100 pieces=10 kg/piece) with a cost price of 5 EUR/kg is put in storage. Two weeks later, the 100 pieces are removed from storage, but only weigh 960 kg. The missing 40-kg evaporated during storage (dependent loss).

As the management of the material, in the meat industry, for example, has an over-proportional influence on business results, it is very important to have exact inventory management for both the piece UOM and the weight UOM.

The Consumer Products area therefore has the following features desirable for a solution for catch-weight materials:

Stock, stock lists and inventory lists should contain the quantities in the UOMs of piece and weight.

Goods movements should be documented in pieces and weight.

The availability check should be based on the quantity in pieces.

Stock should be treated as zero if quantity in pieces is zero.

Quantities should be printed in piece and weight UOM on delivery notes.

Quantities in pieces and weight should be supported in picking and packing processes.

Quantities should be printed in piece and weight UOM on the goods receipt slip.

It should be possible to enter quantities in purchase orders in piece or weight UOM.

Updating in Financials should to take place in weight UOM.

Goods movements and stocks should be documented in quantities in piece and weight UOM.

FIG. 1 is a table showing information from a standard purchase order and the related information captured when the goods are received showing the UOMs of catch-weight materials in a typical meat procurement. In FIG. 1, the purchase order information includes an item number 110 for each type of good, an item description 120, an ordered pieces quantity 130 and an ordered weight quantity 140. The equivalent goods receipt information includes an item number 160 for each type of good, an item description 170, a received pieces quantity 180 and a received weight quantity 190. As seen in FIG. 1, although the ordered pieces quantity 130 and the received pieces quantity 180 are equal for both listed goods, the received weight quantity 190 does not equal the ordered weight quantity 140. As a result, in FIG. 1, from an inventory/logistics perspective, the order is complete. However, the same may not be said from a billing/invoicing perspective. Since invoicing is, generally, based on weight in a meat procurement transaction, and the purchase order weight and actual received weight are not equal, a reconciliation of the weight differences between the ordered and actual received weights may need to be performed to ensure accurate invoicing and payment.

Therefore, there is a need in the art for an automated method and system to permit the efficient and parallel quantity updating of multiple UOMs information for a single good/item.

BRIEF DESCRIPTION OF THE DRAWINGS

FIG. 1 is a table showing information from a standard purchase order and the related information captured when the goods are received showing the UOMs of catch-weight materials in a typical meat procurement.

FIG. 8 is a flow diagram that provides a method for implementing multiple transaction quantities in an inventory management system, in accordance with an embodiment of the present invention.

FIG. 9 is a flow diagram that provides a method for implementing multiple transaction quantities in an inventory management system, in accordance with another embodiment of the present invention.

DETAILED DESCRIPTION

Figure 2:
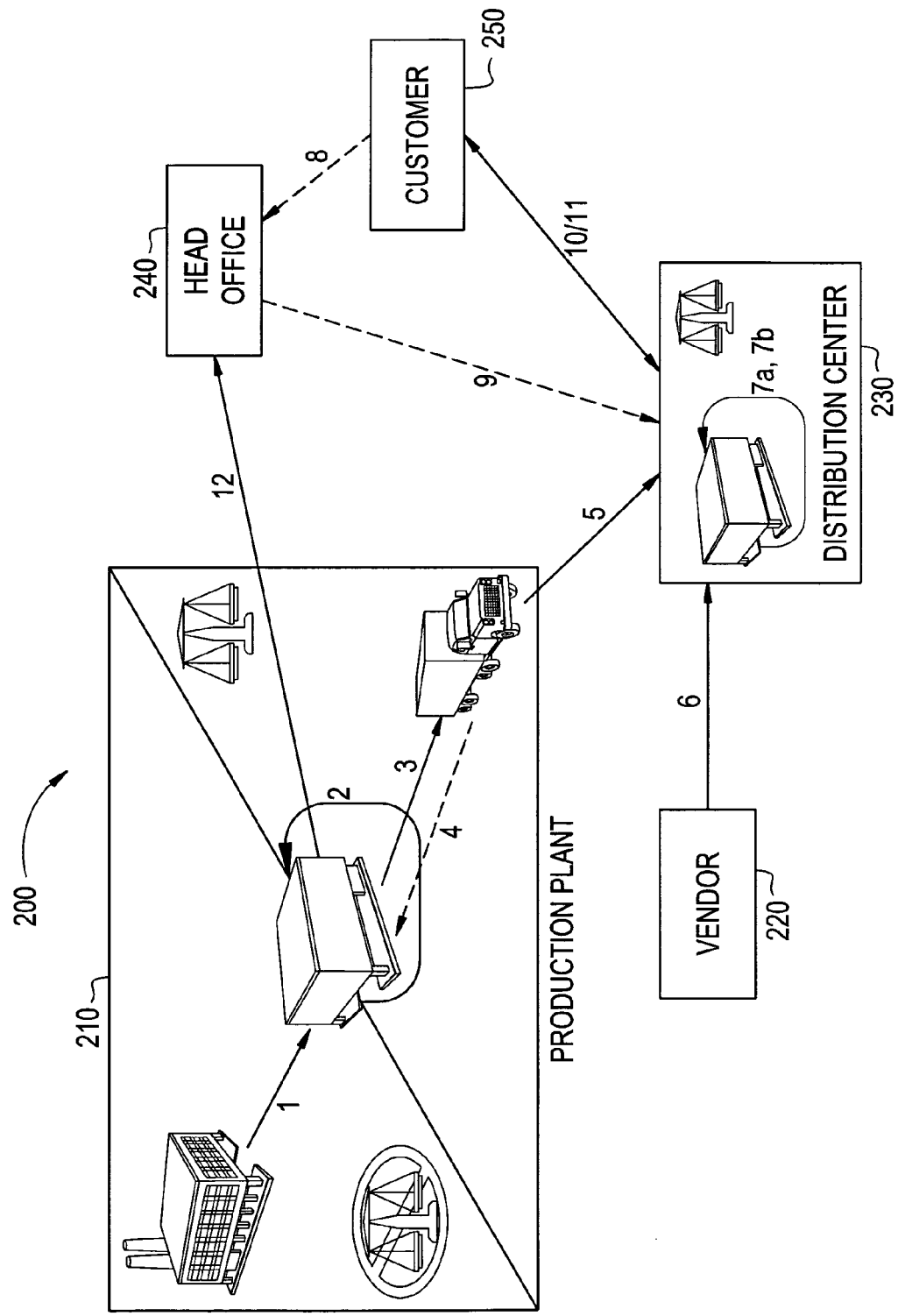
FIG. 2 is a block diagram illustrating the relationships between entities in a supply chain for goods that need parallel quantity updates, in accordance with an embodiment of the present invention.

Embodiments of the present invention provide improved methods and systems for the capture, processing and use of multiple UOMs for a single article type. Although, the multiple UOMs are, generally, not the same, there are embodiments in which they may be the same. In accordance with an embodiment of the present invention, a method may include associating a base unit of measure with an article in a database; associating a parallel unit of measure with the article in the database, the parallel unit of measure having a planned conversion factor to the base unit of measure; and selecting a valuation unit of measure for the article from the base unit of measure and the parallel unit of measure. The method may also include storing a first base unit of measure value in the database for the article from a first location; and storing a second parallel unit of measure value in the database for the article upon issue from the first location, the second parallel unit of measure having a first conversion factor to the base unit of measure. The method may further include storing a new first base unit of measure value in the database for the article from a second location upon receipt of the article at the second location; and storing a new second parallel unit of measure value in the database for the article from the second location upon receipt of the article at the second location, the second parallel unit of measure having a second conversion factor to the base unit of measure.

The following phrases are used herein:

"Parallel quantity update" refers to the system simultaneously updating two or more quantities entered during goods movements. Hereafter, if only two quantities are updated they may be referred to as "two transaction quantities" ("2TQs").

The "base UOM" is the UOM, in which materials are moved and planned, and the "valuation UOM" is the UOM, in which materials are valued. This means that two scenarios are possible:

1. Base UOM≠valuation UOM, e.g., the base UOM=pieces (or an equivalent UOM for a logistic quantity) and the valuation UOM=kg (or an equivalent UOM for the weight); and
2. Base UOM=valuation UOM, e.g., kg (or an equivalent UOM for the weight).

Previously, both UOMs could be represented with a base UOM, as fixed factors could be used to convert between different UOMs (e.g., base UOM is cases, containing an average of 10 pounds). However, automatic conversion cannot be carried out for 2TQ materials, since the relationship between the UOMs is variable. Furthermore, with 2TQ materials, the UOM in which materials are planned and moved is often different from the UOM in which materials are valued. Hereafter, the UOM in which materials are valued is referred to as a valuation UOM and the UOM in which materials are moved or planned referred to as a base UOM.

"Multiple transaction quantities" ("MTQ") is the general term for the quantities in different UOMs that are entered in parallel within inventory management during goods movements and associated processes. Since this term was once used for describing scenarios with at a minimum two independent quantities in different UOMs, the phrase "two transaction quantities" was introduced for the identification of the business need for exactly two transaction quantities that are updated in parallel. Materials updated in two UOMs are referred to as 2TQ materials, which are handled, in parallel independent of their role as valuation or base UOM. If a weight is referred to just as 2ndTQ UOM, this is the additional UOM besides the base UOM independent of its role.

"Catch-weight articles", in the strict sense, are articles for which there is a variable relationship between the base UOM and the 2ndTQ UOM. As the relationship between the UOMs is unknown, or can vary every time goods movements are entered, it is necessary to "catch," i.e., measure, the weight of the goods. This means that a quantity has to be entered for both the 2ndTQ UOM and for the base UOM. This necessitates some form of weighing or measuring of the good before entry. This helps to account for the fact that the articles can undergo natural shrinkage, such as weight loss during transportation and/or over time during storage. As there are no fixed conversion factors between the base UOM and the 2ndTQ UOM, both UOMs have to be updated separately in an inventory management application. The relationships between other alternative UOMs have to be fixed to either the base UOM or the 2ndTQ UOM (i.e., pallets to cases).

"Random weight articles" refer to articles for which there is a variable relationship between the base UOM and the 2ndTQ UOM. The term "random weight" can be used interchangeably with the term "catch-weight."

"Batch-specific UOMs" (e.g., proportion/product UOMs) refers to UOMs that have a batch-specific conversion factor for a material. This conversion factor is fixed for each batch as soon as the batch is posted for the first time. Batches are used for this standard functionality. Stock records are kept in base UOMs for materials with proportion/product UOMs.

In accordance with an embodiment of the present invention, alternative UOMs for goods in the inventory may be created with fixed conversion factors for the base UOM. These fixed conversion factors may be used in all goods movements and in the inventory display to convert quantities in alternative UOMs to quantities in the base UOM and vice versa. However, for many materials there is a variable relationship between alternative and base UOMs (random weight), meaning that fixed conversion factors may not be used. Although the relationship between these UOMs can be taken as fixed in planning processes, in extreme cases it may differ from goods movement to goods movement. Currently, when quantities are updated in just one UOM, the system does not store the variability between the inventory-managed UOMs.

Neither the entry nor parallel update of quantities in different UOMs currently exists to the full extent of its functionality in standard systems. "Parallel update" refers to the parallel and/or substantially simultaneous update of quantities in multiple UOMs with variable conversion factors Until now, the only way it has been possible to enter and update different conversion factors between the base UOM and an alternative UOM is by using batches as a basis. Unfortunately, this solution is not sufficient for many applications. For example, in financial applications, the problem with catch-weight processes is that valuation always uses the base UOM. Therefore, customers may either value on the basis of pieces, or they may use the weight UOM for logistical processes as well. To be able to meet the requirements arising from catch-weight processes, it may be possible to specify the valuation UOM independently of the base UOM. To provide this new option in a catch-weight solution, decoupled financial components may be needed to implement the parallel update of quantities in different UOMs.

FIG. 2 is a block diagram illustrating the relationships and processes that may occur between entities in a supply chain for goods that use parallel quantity updates, in accordance with an embodiment of the present invention. In general, goods in the supply chain may be measured in pieces ("PC") and/or KG. In FIG. 2, a supply chain 200 for the parallel quantity update goods may include a product facility 210, for example, a production plant, a vendor 220, an external distribution center 230, a head office 240 and a customer 250. Within product facility 210 several internally occurring 2TQ processes may include, for example, a goods receipt to production process 1, an inventory process 2, a stock transfer to an external distribution center process 3, and a calculation of average weight process 4. Product facility 210 may also be an origination point for an external 2TQ process, for example, a goods receipt from production plant through stock transfer process 5 to external distribution center 230, and a single UOM process (UOM=KG), for example, an inventory valuation, product cost controlling and costing of product variants process 12 to head office 240. Vendor 220 may also be an origination point for an external 2TQ process, for example, a goods receipt to purchase order and shipping notification process 6 to external distribution center 230. Similarly, external distribution center 230 may be an origination point for several internal 2TQ processes, for example, a goods issue to sales order and billing, proof of delivery ("POD") process 10 that may occur when goods are sent to customer 250 and a total inventory of the warehouse process 7a. External distribution center 230 may also be an origination point for an internal single UOM process (UOM=PC), for example, a goods movement and inventory inside the warehouse per storage location process 7b. Head office 240 may be an origination point for an external single UOM process (UOM=PC), for example, an availability check process 9 to external distribution center 230. Customer 250 may, likewise, be an origination point for an external single UOM process (UOM=PC), for example, a sales order process 8 to head office 240 and an external 2TQ UOM process, for example, a returns from customer process 11 to external distribution center 230 to handle goods returned by customer 250.

Figure 3:
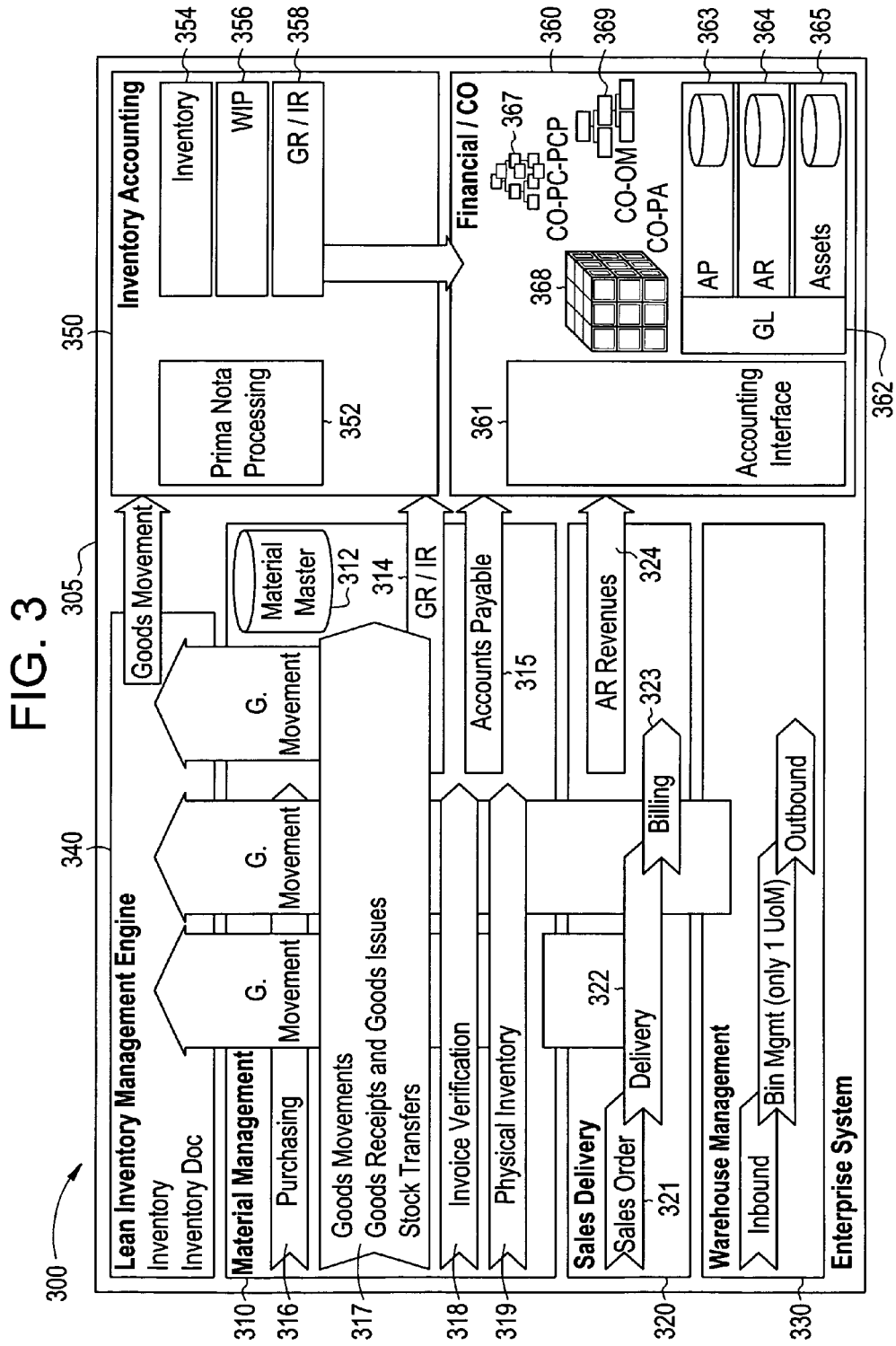
FIG. 3 is a functional block diagram of an architecture for a catch-weight management system, in accordance with an embodiment of the present invention.

FIG. 3 is a functional block diagram of an architecture for a catch-weight management system, in accordance with an embodiment of the present invention. In FIG. 3, a catch-weight management architecture 300 may include an enterprise management system application 305 in which may be implemented a variety of catch-weight management components, including a material management ("MM") component 310, a sales delivery component 320, a warehouse management component 330, an inventory management component 340, an inventory accounting component 350 and a financial component 360. MM component 310 may create alternative UOMs for each good/item with fixed/variable conversion factors relative to the base UOM. In general, the conversion factors may be fixed when used for planning and may be variable when used for good movement and when valuing goods during invoicing/billing. MM component 310 may include a material master database 312 to store and manage the goods, their variable UOMs, and the conversion factors between the variable UOMs for each good. MM component 310 may also include a purchasing element 316; a goods movement element 317 (to track goods receipts, goods issues, and stock transfers); an invoice verification element 318; and a physical inventory element 319. MM component 310 may send goods movement information to inventory management component 340, goods receipt/invoice receipt information 314 to inventory accounting 350, and accounts payable information 315 to financial component 360 for further processing.

In sales delivery component 320 a sales order element 321 may be involved in generating and processing sales orders from customers, a delivery element 322 may control delivering goods listed in the sales orders and verifying the amount of the delivered goods, and a billing element 323 for billing the customers based on the verified amount of delivered goods. As such, in sales delivery component 320 sales order element 321 may be coupled to delivery element 322, which may be coupled to billing element 323. Sales delivery component 320 may also provide accounts receivable and revenue information 324 to financial component 360 and goods movement information to inventory management component 340.

Warehouse manager component 330 may be involved in in-bound and out-bound inventory processes to update the stock of each good in both quantities at the storage location level. In general, the base UOM is used to confirm picking activities and to maintain inventory information. Warehouse management component 330 may also provide goods movement information to inventory management component 340 and may be connected to, and interface with, an external warehouse manager (not shown).

Inventory management component 340 may be involved in storing and managing goods inventories to include stock posting using the base UOM. Inventory management component 340 may provide goods movement information to inventory accounting component 350 for valuation.

Inventory accounting component 350 may be involved in storing, managing and monitoring the value of the inventory. Inventory accounting component 350 may perform prima nota (i.e., initial) processing 352 on incoming goods movement information to provide inventory information 354, work in process information 356 and a goods receipt/invoice receipt information 358. Work in process information 356 may be calculated with each transaction or, alternatively, periodically at some predetermined time. Goods issues for production may be transferred from materials inventory to work in process inventory as an accounting exchange on an assets side. Similarly, activity allocations and overhead for manufacturing orders may also be posted directly to the work in process inventory. Inventory accounting component 350 may provide goods receipt/invoice receipt information 358 to financial component 360.

Financial component 360 may be involved in preparing goods cost estimates based on the valuation UOM by converting material quantities into the valuation UOM using the planned conversion factors defined in material management 310 for the goods. Financial component 360 may include an accounting interface 361, a general ledger ("GL") 362, an accounts payable ("AP") database 363, an accounts receivable ("AR") database 364, an assets database 365, a controlling-product costing-product cost planning ("CO-PC-PCP") hierarchy 367, a controlling-profitability analysis ("CO-PA") matrix 368, and a controlling-overhead management ("CO-OM") hierarchy 369.

Figure 4:
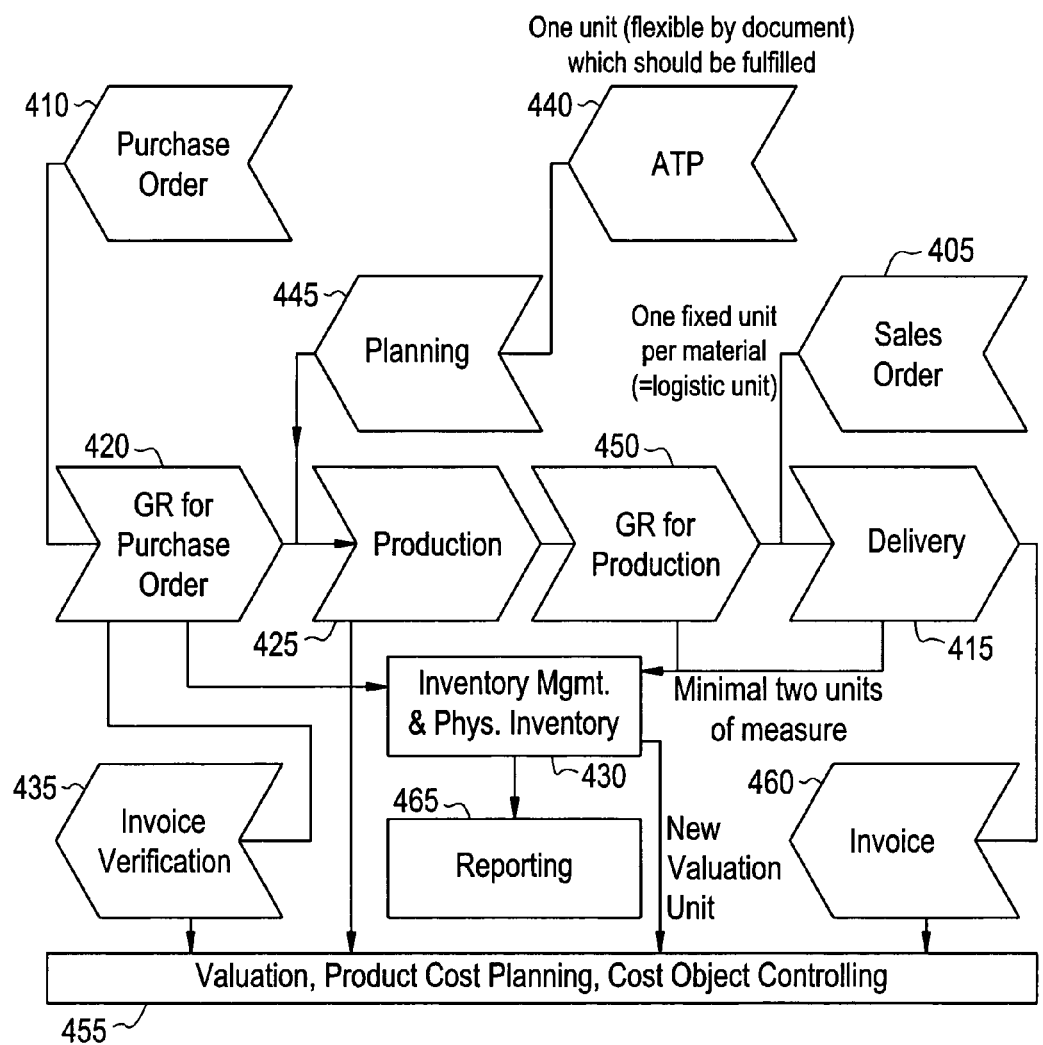
FIG. 4 is a process flow diagram that provides a rough overview of how the different process steps interact with each other and where two UOMs are needed, in accordance with an embodiment of the present invention.

FIG. 4 is a process flow diagram that provides a rough overview of how the different process interact with each other and where two UOMs are needed, in accordance with an embodiment of the present invention. In FIG. 4, a sales order process 405, which may specify a customer order for a good in a single UOM (for example, pieces or each), may be initiated upon receipt of a sales order from a customer. The sales order process may send information on the types of goods and quantities for each type of good to a delivery process 415, in the one UOM. Delivery process 415 may schedule delivery of items in the sales order and may even calculate a second UOM based on a planned conversion factor. Within the picking process both UOMs may be updated with the actual values.

A purchase order process 410 may be started and a purchase order may be sent with one UOM to a goods receipt for purchase order process 420 to produce a goods receipt for the goods in two UOM. Within the goods receipt for purchase order process 420 the actual values for both UOM are entered. The goods receipt may be sent from goods receipt for purchase order process 420 to a production process 425, which may begin the production of the goods specified on the goods receipt as input materials, an inventory management and physical inventory process 430, and an invoice verification process 435 that will be discussed more fully below.

An availability check in an available-to-promise ("ATP") process 440 may be started to begin the initial logistics activities related to the ordered goods including, for example, converting the sales order UOMs into a logistics UOM, if necessary, and send the initial logistics information in the logistics UOM to a planning process 445 that may perform the logistics planning for the ordered goods. Planning process 445 may send its logistics planning information to production process 425, which may use the information in combination with the goods receipt from goods receipt purchase order process 420 to produce a production goods receipt using both UOMs for the finished product. For example, the logistics and valuation UOMs may be used to send a goods receipt for production process 450 and the valuation UOM may be forwarded to the cost object controlling process 455. Goods receipt for production process 450 may capture the produced quantity in both UOMs of a product and send information on the production goods in the two UOMs to delivery process 415 and to inventory management 430. Delivery process 415 may send information on the goods actually received in at least two UOMs to an Invoice verification process 460, which may prepare and issue invoices for the goods produced and delivered to a client and report this information to valuation, cost object controlling process 455. Inventory management and physical inventory process 430 may consolidate and compare actual/measure inventory levels with estimated inventory levels; send both UOMs to a reporting process 465 that may use the information to generate inventory reports and update inventory management 430; and send information about deviations described using a new valuation UOM to valuation, cost object controlling process 455.

In inventory management 430 stock overviews may be available in both UOMs and negative stock may be allowed. A new valuation UOM may be the base for valuation of the stock. The goods' movements functionality with movement types and the physical inventory functionality may support two UOMs. In two-step, internal transfers the quantities for goods issue and goods receipt may differ and, if so, the difference may be posted to a variance account. Likewise, in warehouse processes only the base UOM may be supported. In inbound and outbound processes to the warehouse, a second UOM may be added to the transfer order, although the transfer order requisition may stay with the base UOM and the basis for confirmation of picking activities may also be the base UOM. In case the order UOM in the sales order differs from the logistic UOM, the effect on the process may be that the order UOM may be converted to the base UOM in the delivery document with keeping the original order UOM in parallel for information. Physical inventory within the warehouse may focus on the base UOM. An interface to an external warehouse management system may be implemented either via inbound and outbound deliveries or via the WM-LSR interface.

In accordance with an embodiment of the present invention, all material movements and materials on stock may be valued based on the valuation UOM and standard price or moving average price. Product cost planning/cost estimates may be created in valuation UOM, therefore quantities in UOMs and routing/recipes may be recalculated from the base UOM to valuation UOM using the planned conversion factor from material master database 312. Costing on production/process orders may be based on the valuation UOM. Sales order controlling may be only available in Profitability Analysis ("CO-PA") and not direct on sales orders. Also, there may be no sales order-dependant standard prices.

Although the processes in FIG. 4 described above may appear to occur in a specific order, they may actually occur in the above-described order as well as in alternative orders and either partially or totally in parallel with each other.

In FIG. 3, in accordance with an embodiment of the present invention, the conversion factor from material master 312 may be used in MM component 310, in sales and delivery component 320 and in warehouse management component 330 as a planned conversion factor between the base UOM and the 2ndTQ UOM in those processes where the exact value of the second UOM is not yet known. Since the conversion may also be used between all other alternative UOMs, the following rule may apply: in case the alternative UOM refers to the 2ndTQ UOM, the alternative UOM may have to be in the same dimension as the 2ndTQ UOM. If a common dimension is not identified, the alternative UOM may automatically be referred to the base UOM. The quantity within the header of the bill of material of a 2TQ material may be maintained in the 2ndTQ UOM.

Figure 5:
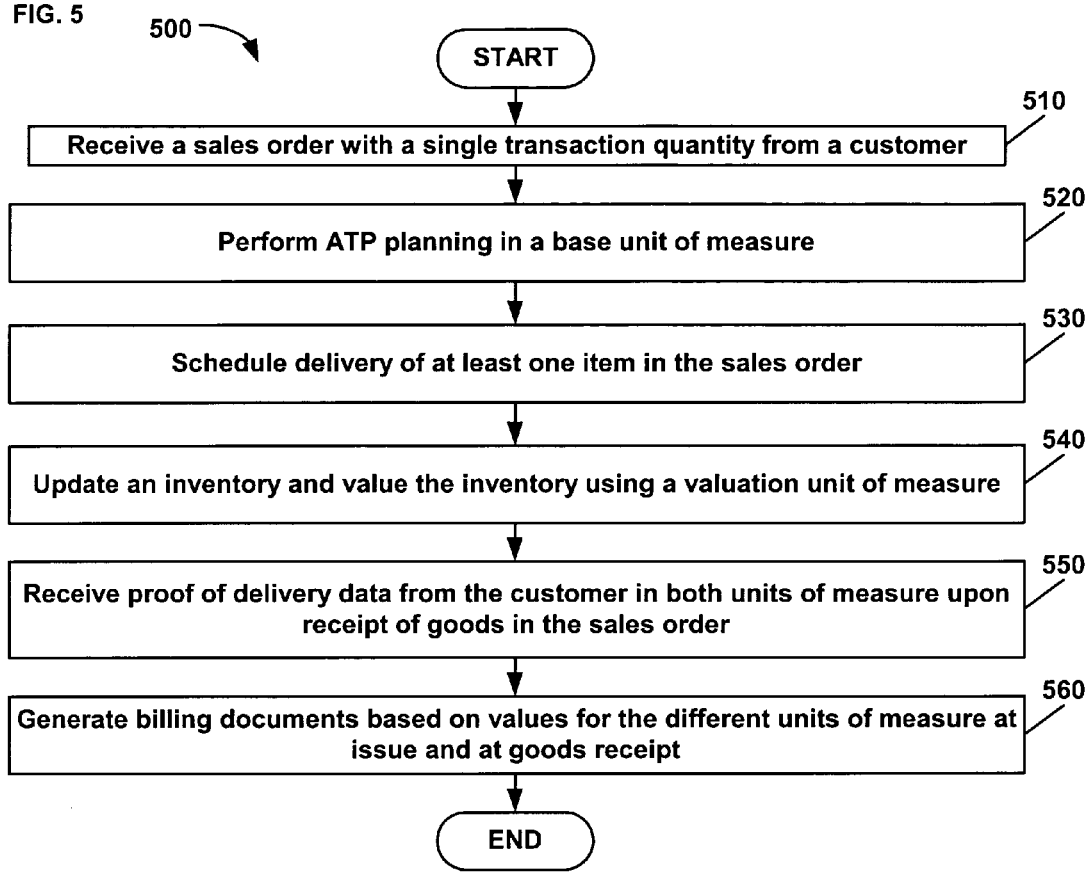
FIG. 5 is an alternative process flow diagram that provides an overview of a sales process 500 in accordance with an embodiment of the present invention.

FIG. 5 is an alternative process flow diagram that provides an overview of a sales process 500 in accordance with an embodiment of the present invention. The sales process may include several sub-processes, such as, for example, a sales order entry, and ATP, a delivery, an updated inventory and value stock, a proof of delivery, and a billing process. In FIG. 5, sales process 500 may include receiving (510) a sales order entry in which the customer may order goods in one UOM that can either be the base, the 2ndTQ UOM or any other UOM (e.g., weight, pieces or pallets). In general, this may be an alternative UOM to the base UOM or the base UOM itself. The pricing may be based on different UOMs (e.g. on the base UOM for an additional handling fee). The pricing for the material itself may be based on weight. The fulfillment may be based on performing (520) a sales UOM ATP check and ATP and MRP planning may be performed in just one UOM, in general, the base UOM for the material. Planning may also be done in base UOM.

the sales process 500 may include scheduling (530) a delivery of the ordered quantity of goods from the sales order to be fulfilled according to allowed tolerances. The second UOM may be calculated using the planned conversion factor. It may be necessary for the customer to be able to implement individual tolerance checks. Both quantities may be entered or changed, since at the time of posting the goods, the exact values need to be known. Packing functionality may need to support the entry of two quantities and handling units ("HUs") (i.e. pallets, cases, etc.) may need to be supported, since they are used for defining pallets. A line item within a handling unit may be a case with an individual value for the weight.

The sales process 500 may further include updating (540) stock levels inventory and valuing stock levels using the different UOMs, as appropriate. The process may still further include receiving (550) a proof of delivery ("POD") data to determine the weight of the delivery at the time of receipt of the goods. As described above, the weight at receipt may differ from the weight at the time of goods issue. The process may still further include generating (560) billing documents based on the value for the different UOMs and based on the pricing in the sales order, but the primary UOM may be weight.

Figure 6:
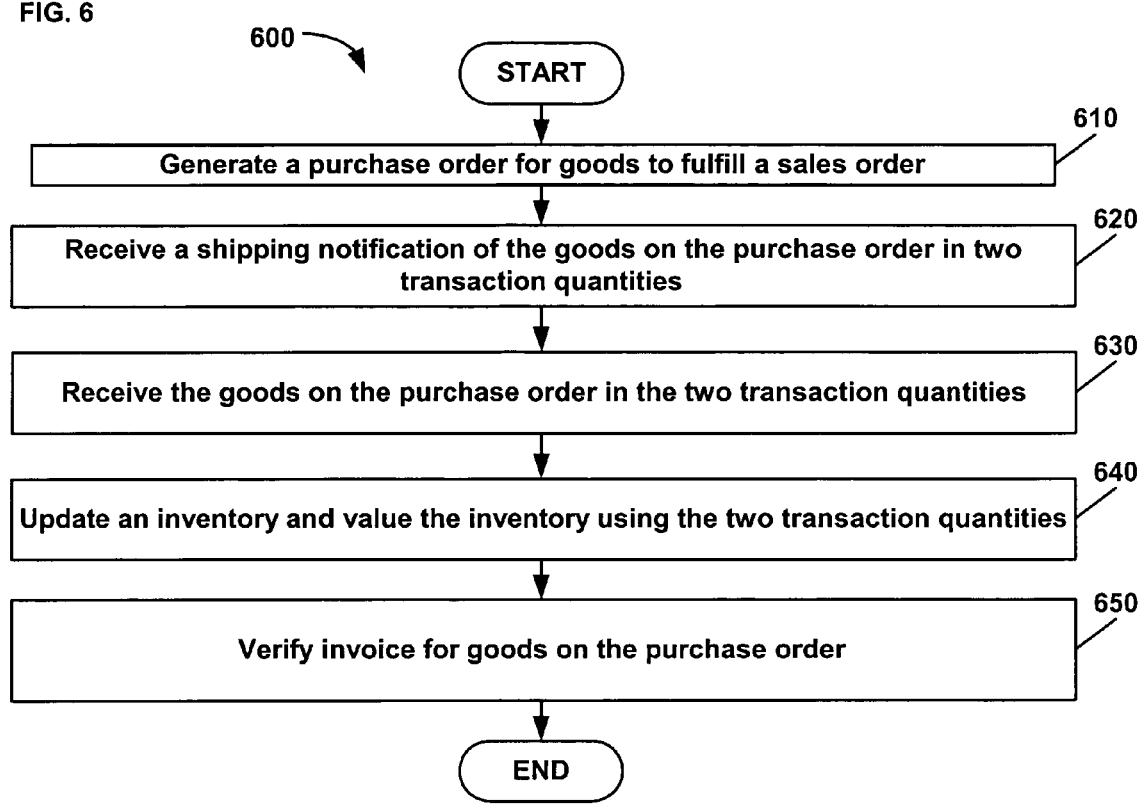
FIG. 6 is another alternative flow diagram that provides an overview of a procurement process 600 that may include several sub-processes, in accordance with an embodiment of the present invention.

FIG. 6 is another alternative flow diagram that provides an overview of a procurement process 600 that may include several sub-processes, in accordance with an embodiment of the present invention. In FIG. 6, generating (610) a purchase order for the goods in the sales order with one UOM to be entered. The purchase order may specify the UOM in which the material is ordered. It may be defaulted from contracts, purchase information records or material master 312. In case of a 2TQ material, the purchase order UOM may be the base UOM or an alternative UOM that may be converted to the base UOM using a fixed conversion rate. Optionally, the order price UOM may indicate the UOM to which the purchase order price relates. The purchase order price UOM may be defaulted with the purchase order UOM, if no order default is set by a purchasing information record or a contract. In the case of a 2TQ material, a check may be activated via a BAPI to determine whether the purchase order price UOM is equal to the valuation UOM of the material.

Procurement process 600 may include receiving (620) a shipping notification from a vendor with the actual quantity in two UOMs. In general, no planned conversion factor maybe used, since the actual quantities are being provided/measured. The process may further include receiving (630) the goods in both UOMs need to be entered. In general, for MTQ materials with quantity-based conditions, the condition value at goods receipt may be repriced per UOM for which a condition exists based on the actual quantities that are entered or calculated. The process may still further include updating (640) inventory stock levels and values using the different UOMs, as appropriate.

Procurement process 600 may also include verifying (650) the invoice for the goods on the purchase order, at the time the invoice is received/entered. While the actual values maybe defaulted by the system (2 UOMs: order UOM and order price UOM), they may also be changed by the invoice clerk to reflect actuals. In the purchase order history the purchase order UOM and the purchase order price UOM may be known. In case the purchase order UOM is weight and the purchase order price UOM is weight as well (independent of the setup of the logistic and valuation UOM) an additional MTQ UOM (i.e. logistic UOM) will not be known in invoice verification. In general, the "purchase order price UOM" is suggested to be set equal to the valuation UOM to determine the value in invoice verification.

Figure 7:
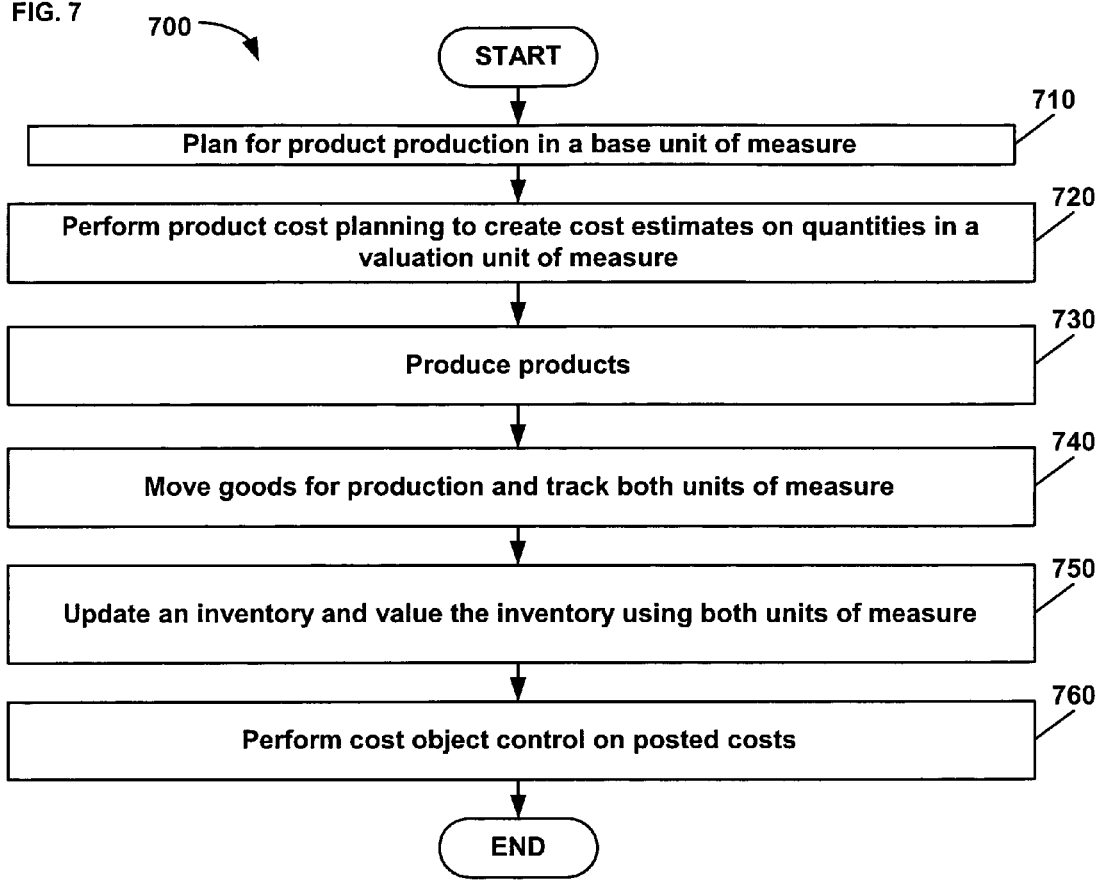
FIG. 7 is another process flow diagram that provides an overview of a production process 700 including several sub-processes, in accordance with an embodiment of the present invention.

FIG. 7 is another process flow diagram that provides an overview of a production process 700 including several sub-processes, in accordance with an embodiment of the present invention. In general, the UOM used in production process 700 may be the base UOM and two UOMs may be used for goods receipt and goods issue for production and associated confirmation processes. In FIG. 7, production process 700 may include the manufacturer performing (710) planning for product production including the sizing of production lot sizes. Process 700 may also include performing (720) product cost planning to create cost estimates for the planned production goods. In general, the estimates may be based on quantities in the valuation UOM. The process may also include producing the goods (730) and moving (740) the produced goods and tracking the goods using two UOMs, for example, the base UOM and the valuation UOM. Production process 700 may further include updating (750) the inventory using the base UOM and valuing the stock using the valuation UOM. Production process 700 may still further include performing (760) cost object control on posted production good costs using the valuation UOM.

FIG. 8 is a flow diagram that provides a method (800) for implementing multiple transaction quantities in an inventory management system, in accordance with an embodiment of the present invention. In FIG. 8, the method may include associating (810) a base UOM with an article in a database, for example, material master database 312, and associating (820) a parallel UOM with the article type in the database where the parallel UOM may have a planned conversion factor to the base UOM. The method may also include selecting (825) a valuation UOM for the article as either the base UOM or the parallel UOM. The method may also include storing (830) a first base UOM value in the database, for example, material master database 312, for the article from a first location. The method may also include storing (840) a second parallel UOM value in the database, for example, material master database 312, for the article upon issue from the first location, the second parallel UOM having a first conversion factor to the base UOM. The method may also include storing (850) a new first base UOM value in the database, for example, material master database 312, for the article from a second location upon receipt of the article at the second location. The method may further include storing (860) a new second parallel UOM value in the database, for example, material master database 312, for the article from the second location, the second parallel UOM having a second conversion factor to the base UOM.

The method (800) for implementing multiple transaction quantities in an inventory management system may further include generating billing information for the article based on the second parallel UOM, for example, in inventory accounting component 350. The method may also include generating logistic information for the article based on the reconciliation of the first base UOM value and the new base UOM value information, for example, in inventory management component 340. The method may also include receiving an order for the article type specified in one of the UOM and the parallel UOM and filling the order for the article type in either the base UOM or the parallel UOM, regardless of which UOM was in the order, for example, in material management component 310.

FIG. 9 is a flow diagram that provides a method (900) for implementing multiple transaction quantities in an inventory management system, in accordance with an embodiment of the present invention. In FIG. 9, the method may include associating (910) a base UOM with an article in a database, for example, material master database 312, and associating (920) a parallel UOM with the article type in the database where the parallel UOM may have a planned conversion factor to the base UOM. The method may also include selecting (925) a valuation UOM for the article as either the base UOM or the parallel UOM. The method may also include storing (930) a first base UOM value in the database, for example, material master database 312, for the article from a first location. The method may also include storing (940) a second parallel UOM value in the database, for example, material master database 312, for the article upon issue from the first location, the second parallel UOM having a first conversion factor to the base UOM. The method may also include storing (950) a new first base UOM value in the database, for example, material master database 312, for the article from a second location upon receipt of the article at the second location. The method may further include storing (960) a new second parallel UOM value in the database, for example, material master database 312, for the article from the second location, the second parallel UOM having a second conversion factor to the base UOM. The method may further include reconciling (970) the first base UOM value and the new base UOM value information of the article, reconciling (980) the second parallel UOM and the new second parallel UOM information of the article; and updating (990) the database, for example, material master database 312, with the reconciled first base UOM and the reconciled second parallel UOM information.

The method (900) for implementing multiple transaction quantities in an inventory management system may further include generating billing information for the article based on the first parallel UOM or the second parallel UOM, for example, in sales and delivery component 320. The method may also include generating logistic information for the article based on the reconciliation of the first base UOM value and the new base UOM value information, for example, in inventory management component 340. The method may also include receiving an order for the article type specified in one of the UOM and filling the order for the article type in the base UOM and the parallel UOM, regardless of which UOM was in the order, for example, in material management component 310.

In accordance with embodiments of the present invention, each application (i.e., implementation of the catch-weight system) may have a central switch to activate the catch-weight system. If the application is active, stock posting may be done in inventory management component 340 in FIG. 3 and the valuing of material movements may be done in inventory accounting component 350.

An exemplary implementation of the catch-weight management system may include the components of FIG. 3. Specifically, the implementation may use MM component 310 to maintain the 2TQ relevance of a material at the client level and may select the second stock keeping UOM and mark the valuation UOM. Changes to the 2TQ relevance may be subject to the same restrictions as changes to the base UOM of a material and 2TQ UOMs may be product UOMs. While proportion UOMs for a material may not be supported for 2TQ UOMs they may be supported with certain restrictions. In general, only standard prices or moving average prices may be used for all materials, even non-2TQ materials, in the catch-weight-environment, and a material may be set-up so that:

The base UOM differs from the valuation UOM (e.g., base UOM=cases; valuation UOM=weight).

The base UOM is equal to the valuation UOM (e.g., base=valuation UOM=weight) and an additional UOM (cases) may be entered within the relevant processes as the 2ndTQ UOM. In this case the value of the 2ndTQ UOM is only used to keep track of the inventory and no process logic may be based on it.

A material may be assigned to a MTQ UOM group and several materials may be assigned to an MTQ UOM group. However, each material may only be assigned to one MTQ UOM group. The MTQ UOM group may determine the conversion routines and in which sub-processes these conversion routines are used to calculate the quantities in the second UOM. In some functions, the second UOM may be automatically calculated based on the value of the first UOM. Where the MTQ UOMs are expected to be added or changed these automatic calculations may be accessible with tolerance checks. In addition, it may be possible to define whether the second UOM that is automatically calculated is open for entry or if the value may be changed manually. In the present embodiment, the user may select the logistic UOM and the valuation UOM.

Quantity conversion routines may determine the conversion factors between the alternative UOM and the base UOM of a material. The quantity in the alternative UOM may be calculated from the quantity in the base UOM. However, the calculation may also take place the other way around. For the conversion of the 2TQ-UOM to the base UOM a planned conversion factor may be maintained in MM component 310 in FIG. 3. Additional requirements may be covered when parallel quantity update is implemented:

If MTQ processing is active in the application and an MTQ material is used, the correct quantity may be determined in accordance with a MTQ quantity calculation. In all other cases, quantities and conversion factors may be determined in accordance with the numerators and denominators defined in a material UOM table in MM database 312.

Conversion of the quantities from an alternative UOM into an MTQ UOM.

Quantity conversion between the MTQ UOM of a material and the UOM that is relevant for valuation may be performed.

To illustrate the quantity conversions that may be performed, the following examples are provided for a sample material identified by the stock number of 4711.

---

Material 4711

| | |
|---|---|
| Valuation | Kilogram |
| MTQ UOM | Piece |
| Alternative UOM | Case |

Conversion factors

| | |
|---|---|
| Piece in kilograms | 1 piece = 10 kilograms |
| Case in pieces | 1 case = 25 pieces, therefore 1 case = 250 kilograms |

Quantity conversion

| | |
|---|---|
| Valuation UOM | 550 kilograms |
| Alternative UOM | Case |
| MTQ quantity | 50 pieces |

Result

Case 1: MTQ processing is active in the application and the stock is managed in pieces.
Quantity = 2 cases
Here the quantity conversion determines the 50 pieces to equal 2 cases, since one case contains 25 pieces and 50/25 = 2.
Case 2: MTQ processing is not active in the application.
Quantity = 2.2 cases
Here the quantity conversion determines the 50 pieces (550 kg) to equal 2.2 cases, since one case contains 250 kg and 550/250 = 2.2 cases.

---

In purchasing element 316, in FIG. 3, stock overviews and other user displayed transactions (i.e., requirement list) in which it is possible to change the display UOM when MTQ processing is not active, may support MTQ quantities when MTQ processing is active. To be displayed in an MTQ UOM, the stock information may be read from the new inventory tables and converted to the MTQ UOM. For other UOMs, conversion may be carried out using the base UOM, as before. The system may also be able to display the quantities in the base UOM and the other MTQ UOM. To achieve the flexibility to do this, conversion of the stock information to a list may occur, which may permit the stock information to be displayed in multiple lines.

When entering a purchase order item for a material in purchasing element 316, the order price UOM may be proposed from material master database 312 or a corresponding purchasing information record. The proposed order price UOM may be edited or changed. A catch-weight material may also be ordered in its valuation UOM. In this case, when entering a purchase order item, order UOM and order price UOM may be the same. At the time of entering a goods receipt for such a purchase order, in general, the quantity in base UOM may be entered in addition to the quantity in order UOM and in order price UOM. The following description explains different options for the procurement of 2TQ material number 4711 by a vendor, vendor 007.

Master Data:

---

Material: 4711

| | | |
|---|---|---|
| Base UOM: | Eaches (EA) | |
| Valuation UOM | (= 2ndTQ): Kilogram (KG); | Conversion ratio: 10 KG = 1 EA |
| Alternative UOM: | Box (BOX); | Conversion ratio: 1 BOX = 20 EA |

Purchasing information record for material 4711 and vendor 007:

| | | |
|---|---|---|
| Order UOM: | Case (CSE); | Conversion ratio: 1 CSE = 12 EA |
| Order price: | 11 EUR/KG; | Conversion ratio: 1 CSE = 120 KG |

---

In the purchasing information record an alternate order UOM may be defined that is not defined in material master and assigned a conversion factor.

The purchasing information record (as in material management 310) may allow a flexible order UOM for the purchase order. Therefore, an order UOM in a purchase order that differs from the one in the purchasing information record (e.g., in material management 310) may be entered. Some examples for entering UOMs during the external procurement process based on the above master data include the following:

EXAMPLE 1

---

Purchase order ("PO"):

PO quantity: 1 CSE,    Net price: 11 EUR/KG, 1 CSE = 120 KG
These data may be changed and the system may display: 1 CSE = 12 EA (order UOM/base UOM conversion ratio)

Goods receipt:

Quantity in UOM of entry:    Quantity in PO price UOM: 120 KG
1 CSE;
These quantities can be changed and the system may display the quantity in the base UOM: 12 EA
In addition, if the quantity in the UOM of entry = BOX instead of CSE (e.g. 0, 5 BOX) then the program may display the quantity in base UOM, e.g., 10 EA.

Invoice verification:

| Amount: | 1320 EUR (without tax) for Quantity: | 1 CSE; |
|---|---|---|
| Quantity in PO price UOM: | | 120 KG |

These quantities may be changed.

---

EXAMPLE 2

---

Purchase order:

PO quantity: 1 BOX,    Net price: 11 EUR/KG, 1 BOX = 200 KG
These data may be changed.
In addition, the system may display: 1 BOX = 20 EA (order UOM/base UOM conversion ratio)

Goods receipt:

Quantity in UOM of entry:    Quantity in PO price UOM: 200 KG
1 BOX;
These quantities may be changed.
In addition, the program may display the quantity in the base UOM: 20 EA Invoice verification:

Amount:   2200 EUR for Quantity: 1 BOX;   Quantity in PO price UOM: 200 KG
These quantities may be changed.

EXAMPLE 3

Purchase order:

PO quantity: 10 KG, Net price: 11 EUR/KG,
This quantity may be changed.
In addition, the system may display: 10 KG = 1 EA Goods receipt:

Quantity in UOM of entry: 10 KG;
This quantity may be changed.
In addition, the system displays the quantity in the base UOM: 1 EA Invoice verification:

Amount: 110 EUR for Quantity: 10 KG;
This quantity may be changed.

---

For third-party purchase orders, purchasing element 316 may assume that a statistical goods receipt is posted before the billing document may be created. Therefore, a third-party purchase order item may be set up to be invoiced via a goods-receipt-based invoice verification system. Such a goods-receipt-based invoice verification may guarantee for a third-party purchase order item that a goods receipt is posted before an invoice document may be posted.

Physical inventory element 319 may perform inventory management to post goods movements for catch-weight managed materials. Although not all transactions for goods movements may be supported for the catch-weight materials, the quantities may be stored and managed by Inventory Management (340) for all and the material values may be stored and managed by inventory accounting component 350, non-catch-weight managed materials as well as catch-weight managed materials.

In FIG. 3, when entering a goods movement, the different UOM quantities for the goods may be entered. For materials that are not catch-weight managed, the standard fields for quantities may be ready for input, although the catch-weight specific quantity fields may not be visible. In general, the catch-weight specific quantity fields will only be visible and ready for input for catch-weight managed materials. The system may be able to default to values for the different quantities. The default logic may be implemented in a Business Add-In (BADI). Moreover the BADI may contain an implementation to check tolerances, i.e., the relation between the quantity in base UOM and valuation UOM.

A physical inventory for materials in warehouse management 330 ("WM") may be done as always, because quantities in WM 330 may be managed in one UOM, the base UOM or an alternative UOM to the base UOM. When posting the differences, an approximation for the quantity in the valuation UOM may be calculated. The physical inventory information in the inventory management component 340 may provide for the approximated quantities in base UOM as well as in 2ndTQ UOM (or corresponding alternative UOMs)

Invoice verification element 318 may receive invoice documents with actual values. In invoice verification element 318, only two quantities might be entered: the quantity in a purchase order UOMs and in purchase order price UOMs. The values and quantities defaulted to by the system may be edited in an item list. If order UOM and order price UOM are identical, only the field for the quantity in order UOM may be editable. Therefore, the quantity in order UOM and order price UOM will then be the same. In general, standard default logic may be used during an assignment or reassignment process. Although, the standard default logic may not be suited for all customers that work with the catch-weight solution, a BADI may be used to implement customer-specific default logic for quantities and values.

Invoice verification element 318 may use the catch-weight invoice documents to update the purchase order history in MM component 310 by updating the quantity in order UOM and in order price UOM as well as the invoiced amounts. Goods receipts may only be used to update the purchase order history with the quantities in order UOM and order price UOM as well as in base UOM. In general, the goods receipts will not write the corresponding values to the purchase order history and no changes are necessary in the invoice verification element 318 for a correct update of purchase order histories.

For certain products, such as precious metals, invoice verification element 318 may automatically perform "repricing" of the purchase conditions during goods receipt for the purchase order. The repricing may replace the original condition price with the appropriate current price (for example, the current gold price). The requirement for MTQ materials is that for quantity-based conditions, the conditions value at goods receipt may be repriced per UOM for which a condition exists, based on the actual quantities entered or calculated. This means that the system may carry out a quantity-based "repricing". This requires, in principle, waiting to perform the repricing until all quantities may be known. In addition, the problem of quantity variations may be handled by invoice verification element 318. This means that in cases of under or over quantity deliveries, invoice verification element 318 may either calculate new prices for the affected scales, or refer the scale conditions to the planned quantities from the purchase order, according to customer requirements.

Alternatively, price determination in purchasing may be performed using the price copy control technique. In this technique, the document conditions of the purchase order position may be transferred at goods receipt and updated as needed. As a result, an independent price determination may be possible in the material document and the document conditions may be stored for the material document by specifying a copy control in the system. What this means is that the system may determine how the document conditions of an order item of document type X, item category Y may be transferred to a material document item of document type Z (movement type Z). As a result, the conditions may be copied and undergo a price determination in accordance with the price determination category. For example, the following may occur:

Adjust document conditions to the goods receipt quantity;
Adjust document conditions to the goods receipt quantity, re-determine the subsequent settlement conditions;
Adjust document conditions to the goods receipt quantity, re-determine the current precious metal price; and
Re-determine document conditions but transfer manually entered conditions from purchase order item.

Currently, the ordered and delivered quantities may be updated in the purchase order price UOM and the purchase order UOM in the purchase order history and the associated history. For MTQ materials, the quantities in the corresponding UOMs may be to be adjusted to the actual entered or calculated quantities after goods receipt. This may be illustrated by an example from the Consumer Products area. For example, cheese may be ordered from a vendor in boxes containing five rounds of cheese, but the actual weight of a box of cheese cannot be determined at the purchase order stage. The purchase order price UOM is in kilograms. A conversion factor for kilogram to box must therefore be given for price determination in the purchase order. The actual weight of the cheese is not determined until goods receipt, when the delivered cheese is weighed. The conversion routines that convert the purchase order price from purchase order UOM to valuation UOM instead of base UOM may be adjusted. The conversion is needed, for example, to compare the valuation price and the purchase order price. As the valuation price now refers to the valuation UOM, the base UOM may be replaced by the valuation UOM.

When the invoice is received/entered, the actual values (including delivery costs) may be defaulted to by the system and inserted, either manually or automatically. In the purchase order history the purchase order UOM and the purchase order price UOM are known. In case the purchase order UOM is weight and the purchase order price UOM is also weight (independent of the setup of the logistic and valuation UOM), the logistic UOM may not be known in invoice verification. The purchase order history may be displayed in the purchase order UOM, and in the purchase order price UOM. Because of requirements in invoice verification, it may also be necessary to be able to display the purchase order history in the valuation UOM, for MTQ materials. Therefore, the purchase order price UOM may be equal to the valuation UOM, since the valuation UOM may not be explicitly added to invoice verification.

Since the goods receipt is always to be posted in financial components 360, in FIG. 3, the invoice verification element 318 may assume that no goods receipt for the purchase order has taken place (=invoice receipt before goods receipt). Therefore, invoice verification element 318 may post the complete invoiced amount (excluding taxes) to goods receipt/invoice receipt ("GR/IR") information 358, independent of the sequence of invoice receipt and goods receipt. In general, invoice documents may not be posted to stock accounts. The posting logic for invoice verification element 318 may be adjusted and may be valid for all transactions, e.g., when posting invoices, credit memos, subsequent debits and credits. Canceling invoice documents may also follow this posting logic. In general, direct posting to material stock accounts will not be supported in the catch-weight solution.

The catch-weight system may only be used to clear quantity differences, but may not call accounting interface 361 if there is only a difference between delivered and invoiced quantity. The transaction may only create a logistics document and an entry in the purchase order history to balance the quantity. However, in the catch-weight system it may be necessary to also forward the quantity differences to inventory/accounting component 350. Accounting interface 361 may transfer the necessary GR/IR data to inventory accounting component 350 where it may be used to create line items in the corresponding journal.

In the architecture 300 illustrated in FIG. 3, a third-party order may create a purchase order requisition that may later be used to create a third-party purchase order. The third-party order may always be created in the order UOM and the order UOM of the third-party purchase order may correspond to the same UOM, i.e., it may be adopted from the third-party order. As a consequence goods receipts and invoice documents that are posted for a third-party purchase order item may contain the correct quantities that may be forwarded to SD component 320 for billing. The billing index may be built from the incoming invoices that are posted for a third-party purchase order. Since the billing index does not need the 2TQ quantity, which only serves as a trigger for billing, the interface of invoice verification element 318 to SD component 320 need not be extended.

In the catch-weight solution the stock information may be kept in inventory management component 340 and may have a stock overview transaction that receives the data to be displayed from inventory management component 340 and may show the stock in two different quantity UOMs.

In accordance with the present embodiment, in sales delivery ("SD") component 320, there is, generally, only one UOM in the sales order available. According to the entered material there may be a check whether it is a 2TQ material or not. For 2TQ materials, only an indicator may be set in the background. The following requests may be taken into consideration for the sales order processing:

Sales order quantity fulfillment (fulfillment problems); and
Debit memo request and credit memo request for 2TQ-relevant materials.

In accordance with the present embodiment, the fulfillment of a sales order may be done in sales UOM for catch-weight items (instead of base UOM for standard items). In the sales order item, the order quantity that is still open may be calculated based on the quantity that has already been delivered, the under-delivery and over-delivery tolerances and the completion rule, and a status may be determined. Normally for non-catch-weight materials the basis for the calculation of the open quantity and the status determination is, apart from materials with batch-specific UOMs, the quantity in base UOM.

In the architecture 300 illustrated in FIG. 3, the 2ndTQ quantity from billing document element 323 may not be transferred to the follow-on document in debit memo and credit memo requests (e.g., order documents) for catch-weight materials. Since the price determination may be based on the 2ndTQ quantity, the correct process may be to directly transfer the billing document to a credit or debit memo where changes may be directly entered in the credit/debit memo. When a credit or debit memo request is being created, an information message may be displayed, if a 2ndTQ quantity is available in the referenced billing document. If so, the credit or debit memo may be created directly. In this case the credit memo may be created with a status of "blocked" and released to financial component 360 via accounting interface 361 after the correct 2ndTQ quantity is entered. In this way an approval process may be established by directly using credit and debit memos without an intermediate debit or credit memo request. Return Orders may be handled with restrictions regarding the standard, for example, 1. Entering a second quantity via delivery. In general, the return order may only be created with reference to an order using one UOM that may be flexible. The quantity for the second UOM may be entered along with the delivery that is created for the return order.
2. Entering the second quantity via credit memo. In general, the return order may be created with reference to an order using one UOM that can be flexible. The second quantity may be entered via a credit memo with reference to an invoice.

If it is not possible to enter the second quantity in a return order, the second quantity may be entered later in the process.

In billing element 323 the 2ndTQ quantity that may be updated for each delivery item may also be available in the billing document for price determination. In general, it may be sufficient to access the relevant delivery items to determine the relevant condition quantities and condition values in the billing document. However, since prices and conditions may be determined again in the billing document, quantities may be changed when a billing document is created by billing element 323. As billing documents may also be used as reference documents for credit and debit memos, the 2ndTQ quantity may be updated for the billing document too. This solution may permit a user to create credit and debit memos as billing documents with reference to an existing billing document and then the defaulted catch-weight quantities from the reference document may also be changed when creating the credit and debit memo. In the case of a new valuation UOM the interface to financials may include the quantity relevant to the valuation. In outbound processes, only delivery based billing might be possible and order-related billing may not be supported (i.e., cash sales), except for third-party ordering. Third-party ordering may also be possible for catch-weight materials under certain conditions.

Price determination for 2TQ quantities may be carried out with the quantities that were created or calculated for the purchase order goods receipt and in the billing document in SD component 320. This means that the quantity conversion in the price determination may not always run with the numerator and denominator from the (planned factors) material management component 310. The 2ndTQ quantity created or calculated in their relevant process may be taken into consideration when determining the condition basis for quantity-based prices or conditions. The prerequisite for this is that this quantity is already in the price determination. As a result, the quantities may be transferred to the relevant application when calling the price determination. There are three different cases, which may result from determining the condition basis:

Case 1: The condition UOM is not the 2ndTQ UOM (condition UOM≠$2^{nd}$ TQ UOM).
  The condition basis may be calculated using the conversion factors defined in the material between the base UOM and the condition UOM. This is the standard scenario.
Case 2: The condition UOM is equal to the 2ndTQ UOM (condition UOM=$2^{nd}$ TQ UOM).
  The condition basis may be adjusted to be the same as the 2ndTQ quantity transferred to the price determination. In this case no calculation with conversion factors has to be done. For example: the valuation UOM may be adopted as the condition UOM, so for a sales order quantity of 10 kg, the sales order quantity (i.e., 10 kg) is invoiced.
Case 3: The condition UOM refers to the 2ndTQ UOM.
  In this case the system may calculate the relation of the different UOMs. Therefore the condition basis may be determined using a quantity conversion routine that calculates the correct quantity from the material, 2ndTQ UOM including the quantity belonging to the material, condition UOM, and conversion condition from condition UOM to 2ndTQ UOM.

In outbound deliveries the sales UOM may describe the UOM being transferred from the preceding documents (particularly the order: sometimes also with other descriptions) as the delivery UOM. Fulfillment in sales UOMs may be the logical approach from the process point of view. However, as long as the ATP check is only done in the base UOM, this may cause inconsistencies during the process, if, for example, a weight UOM was used in the order and cases are the base UOM. The completeness of the picking process may always be checked with the base UOM independent of the sales UOM used in the customer order. To guarantee a consistent process, the sales UOM (of the delivery), in general, is either the base UOM or it is convertible using a fixed ratio. Under this prerequisite, preceding documents may be completed on the sales UOM (i.e., batch splitting) for 2TQ materials. In the WM interface, the logic may work with the base UOM so the delivery may be completely picked, if the quantity of the base UOM is fulfilled.

When creating an outbound delivery from preceding documents (for example, order, stock transfer order, etc.), all planned quantities may be copied and an additional 2ndTQ quantity may be calculated or set from sales or base quantity. When a rush order is saved, one or more deliveries may be created. The details given above may still be relevant, regardless of the fact that no availability check may be run. When a delivery is created without a reference, the planned conversion factors from material management component 310 may be used to convert delivery quantities and quantities stored. Otherwise, the same process may be used as described above for changing the delivery.

An automatic batch determination may be performed when creating deliveries and changing individual items. The batches that are determined may be added as batch split items from the delivery with reference to the batch's main item. The quantities of the sub items on the main item may be accumulated in the base UOM. At the same time, they may be taken from the quantities that are to be delivered in sales and base UOMs so that these quantities may be reduced to zero for an item that is completely covered by batches. The delivery quantity and the remaining 2ndTQ UOM may be reduced on the main item one by one using the relevant quantity from the batch split items instead of being calculated using the planned conversion factors from the stored quantity.

Likewise, correlated items in the delivery (for example, bills of material, delivery groups, etc.) may consist of a main item and several sub items. If the quantity is changed on the main item, the quantities in the sub items may automatically be correlated via the quantities in base UOM.

Creating a picking order may be accomplished by creating a WM 330 transfer order. When this is created, the quantity in sales UOM that can be converted by planned factors into the base UOM may be entered as the target quantity in the base UOM. In case several transfer orders are generated for a delivery item, the quantity may be adjusted accordingly. If the WM component 330 is handling-unit management active, the picking order may contain single quantities or handling units.

The net weight of a non-2TQ quantity may result directly from the net weight stored for the base UOM in the material management component 310. The gross weight and the volume may depend on the sales UOM and may be calculated using the fixed conversion factors from the stored quantity. When the 2ndTQ UOM is a weight or volume UOM, the corresponding weight or volume fields may be synchronized automatically correspondingly to the 2ndTQ quantity. In this case, for 2TQ materials, the weight and volume data from material management component 310 may be only a proposal as long as the actual 2ndTQ quantity has not been entered/caught. The gross weight/volume of a 2TQ material may be determined based on the master data and the sales UOM, as long, as no actual 2ndTQ quantity has been caught. When the actual 2ndTQ quantity has been determined and entered, the corresponding gross UOM (gross weight, volume) may be calculated based on the actual 2ndTQ quantity, the sales UOM and the tare (i.e., gross–net). If UOMs are displayed as weight or volume UOMs, then the net weight and volume fields may no longer be changed. Otherwise, as described above, weights and volumes that have been changed manually may be adjusted proportionally.

Business Application Programming Interfaces ("BAPIs")/Intermediate Documents ("IDocs") may contain additional optional fields for the additional 2ndTQ quantity. In addition, the 2ndTQ quantity in the proof of delivery will be provided.

An incompleteness protocol may be written, if the 2ndTQ quantity picked or packed is not entered manually or the calculated quantity based on planned conversion is not confirmed manually or automatically. If this occurs, goods issue and invoice documents may not be created.

The inbound delivery is the equivalent of a shipping notification, which is simply an Electronic Date Interchange (EDI) message. A goods receipt ("GR") to the warehouse may be carried out using an inbound delivery. Extensions to the inbound delivery may be made analogous to the previously described extensions. In addition to quantity in a base UOM, the 2ndTQ quantity may be entered. If one of the updated UOMs is a weight UOM, the net and gross weight may be adjusted in the delivery.

In the architecture 300 illustrated in FIG. 3, transactions in WM component 330 may be oriented towards the physical processes in the warehouse. A simple removal from storage, therefore, may be a process consisting of several steps, for example, removal from storage=creating a transfer order+ receipt confirmation+material transport confirmation. The material stocks may be held in WM component 330 on the storage bin level in base UOM only. The stock in 2ndTQ UOM may be known for each material for the whole warehouse (=total stock of the storage location in inventory management), but may not be known on the storage bin level. Internal movements within the warehouse (i.e., from bin to bin) generally do not need the 2ndTQ quantity. The additional 2ndTQ quantity may only be needed for movements that change the total stock of the warehouse (or more precisely the total stock of a storage location). Such movements may be removals for an outbound delivery or transfer postings from one storage location to another. The stock may be updated in the logistics UOM when it is placed in storage or removed from storage. The quantities in 2ndTQ UOM may be entered during confirmation of a transfer order ("TO") in WM component 330. The physical inventory on the storage bin level may not be possible for the 2ndTQ quantity, as it is generally not held at the storage bin level. If stock differences occur either inside the physical inventory process (i.e. on the base UOM level) or outside the physical inventory process (e.g. one missing piece on a storage bin during picking) the stock in inventory management may be updated using the planned conversion factor or an average factor on storage location level, which may estimate the unknown 2ndTQ quantity. Since handling units may also be supporting 2ndTQ quantities, they may be used to keep track of 2ndTQ quantities inside the warehouse at the pallet level (i.e. on the handling unit level).

The IDocs of a warehouse management warehouse control unit ("WM-WCU") interface may be enhanced to include the relevant UOMs (i.e., 2ndTQ UOMs and 2ndTQ quantity fields). In this way 2ndTQ quantities may be transferred to a subsystem (e.g., a Warehouse Control System) and may be confirmed again by the subsystem. The BAPIs for the integration of a decentralized WM component 330 may contain additional optional fields for the 2ndTQ quantity.

Internal stock transfers (i.e., transfer from one storage bin to another, like a replenishment to a picking bin) are generally, not relevant for the 2ndTQ quantity, since the total stocks in the warehouse for 2TQ materials in internal movements do not change. As a result, transfer orders for such transfers may not need 2ndTQ quantities.

Delivery is complete, if the transfer order has fulfilled the required quantity from the delivery in the base UOM or in a UOM, which has a fixed conversion factor to the base UOM.

Handling units are packages that may be used for the logistics-related components. There are special handling unit managed storage locations whose stock are managed by Handling Unit Management. The handling unit may lead to material transfer postings for packing and unpacking processes. A handling unit is a n-level hierarchy that may contain materials on every level. These material items may use only the base quantity and/or, for catch-weight relevant materials, the 2ndTQ quantity. The 2ndTQ quantities may be evaluated and posted in the goods movement postings for the handling units between HU and non-HU managed storage locations. It may be possible to enter and maintain the 2ndTQ quantity for every material item of a handling unit. Handling unit management may be integrated into the WM component 330 and the delivery processes. The following processes may be supported for catch-weight relevant materials in WM component 330:

Inbound and Outbound Delivery. During packing and unpacking within outbound and inbound deliveries it may be possible to enter and maintain the 2ndTQ quantity for catch-weight relevant material items in handling units.

Stock transfers. During transfer of handling units from one storage location into another storage location it may be possible to maintain the 2ndTQ quantity for catch-weight relevant material items.

Handling Unit Goods Receipt of Finished Products in Production. During goods receipt of handling units from production it may be possible to enter and maintain the 2ndTQ quantity for catch-weight relevant material items.

Physical Inventory on handling unit level. On the handling unit level a physical inventory may be executed for the base UOM as well as for the valuation UOM.

In production planning and control ("PP"), it may not be necessary to update the valuation UOM in the order even if it varies from the base UOM, since the production can still operate with production quantities and base quantities. Only from a controlling perspective may it be necessary to keep track of the confirmed values in the valuation UOM, for example:

Preliminary costing. If the valuation UOM is not equal to the production or base UOM, the valuation quantity may be calculated using fixed conversion factors from the base quantity.

A planned conversion factor from valuation UOM to base UOM may be maintained in material management component 310.

Actual costs or final costing. The valuation quantity may be entered or may be able to be calculated and the valuation UOM may be entered during posting goods movements.

In confirmations of production orders the goods movements for 2TQ components may be supported. This may also apply for back flushing of 2TQ-managed components if the 2TQ material is combined with product UOMs. The interim table for posting confirmations that is also used from a process control system ("PCS") interface will be extended with an additional 2ndTQ quantity.

The material quantity calculation may stay unchanged to permit using the available functionality for 2TQ materials in combination with product UOMs. Material quantity calculation may also be used after confirmation of the process order for adapting the planned quantities of component materials even with product UOMs.

Goods movements that were automatic may be triggered using process messages and process instruction sheets. It may also be possible to use goods movements' postings for 2TQ materials, to copy the 2TQ quantities from a subsystem in process messages, and create the 2TQ quantities in the process instruction sheet. As the 2TQ function concerns the quantity special stock segments and all goods movements in particular, it may be considered to provide the relevant statistics update with the information on quantities in two UOMs. An availability check may be carried out for the base UOM only.

For batch-specific UOMs, the ATP check 440 and purchase order process 410 may only be able to map to the base UOM, such that it may be needed to couple the product quantities and the 2TQ processing. Two priorities may be implemented for the conversion:
1) The conversion factor on the material level may be used as the planned conversion factor, if no batch or actual 2ndTQ quantity has been entered.
2) The conversion factor on the batch serves as a more detailed planned factor and may be used in the batch determination for planning conversion especially. The batch conversion factor may only be used if no actual 2ndTQ quantity was created.

Unlike product quantity processing, this conversion factor is, generally, only a planned factor on batch level without 2TQ.

The following criteria may be relevant to selecting batches in the batch determination:
  Selection criteria may be stored as characteristic values in the classification system and synchronized with the corresponding characteristic values that are defined as a specification for the batch.
  Available quantities may be determined using the ATP check.

Similarly, the following restrictions may be relevant to 2TQ materials:
  The requirement quantities (from MRP) transferred to the batch determination may, generally, only be fulfilled in the base UOM.
  The relation between several quantities (in different UOMs) may not be used as a selection criteria.
  The requirement quantities (from MRP) may only be fulfilled on the basis of the UOM that is relevant to the availability check.

The 2ndTQ quantity may be determined in the batch determination according to the planned conversion or calculated according to a defined conversion routine. Only in exceptional cases may the 2ndTQ quantities have to be manually entered in the batch determination.

The 2ndTQ quantity may be determined according to the planned conversion in the stock determination or calculated according to a defined conversion routine. In exceptional cases, the 2ndTQ quantity might be entered manually.

In the architecture 300 illustrated FIG. 3, all goods movements may be valued in inventory accounting component 350 at standard prices or moving average price and documented with financial documents. Valuation may always be on the basis of the valuation UOM. Other UOMs are, generally, not available in financials component 360. To correct variances between the physical inventory and the book inventory, physical inventory may be taken on key dates. The inventory quantity differences may be entered in the logistics components, while valuation may take place in financials component 360.

Goods receipts and invoice receipts may be integrated with the new inventory management in financial component 360. Goods receipts may be valued at standard price, but not with the purchase order price. When the GR/IR account 358 is cleared, purchase price variances may be posted.

Production scenarios include production by lot size (PP production orders) and process manufacturing (PP-PI process orders). Both make-to-stock production and make-to-order production scenarios are possible. For production orders and process orders, activity consumption might only be recorded in production confirmations. Central entry of goods movements facilitates both goods issues and goods receipts for orders to be entered and posted. Overhead may be allocated in the period-end closing activities. The value of the work in process may be corrected and target costs may be calculated.

Sales processing may remain in sales delivery component 320. Goods issues for sales orders may be valued and posted in the financial component 360. Billing may be triggered in SD component 320 and posted in financial component 360. Sales revenues and the cost of sales may be analyzed in profitability analysis ("CO-PA") matrix 368.

The catch-weight management architecture 300 illustrated in FIG. 3, including inventory accounting component 350, may be activated at the client level. All financial valuations may be based on the quantity in the valuation UOM, which may be relevant to both catch-weight and to materials with fixed conversion factors. Only the valuation UOM may be available in the inventory accounting component 350 and may be defined independently of the base UOM.

General ledger ("GL") 362 documents may be updated in financial component 360 for all financial-relevant transactions. In addition, the line items for GL 362 documents may be stored (such as, accounts receivable and payable). For example, only the line items that document business transactions from the perspective inventory accounting component 350 and may be created in financial component 360 might be stored, such as warehouse inventories and work-in-process inventories and GR/IR (goods receipt/invoice receipt allocation). This helps ensure that no redundant documents are stored in either inventory accounting component 350 or financial component 360. From the perspective GL 362 ledger, the business transactions may be documented in (document+line item) and, depending on the subsidiary ledger, either assets, customers, and vendors in financial component 360 or inventories and GR/IR in inventory accounting component 350.

Since no catch-weight processes need to be supported for GL 362, all GL 362 functionality in financial component 360 may continue unchanged. However, subsidiary ledgers affected by changes (e.g., materials/work in process or inventories) may be re-implemented in inventory accounting component 350. Postings from these subsidiary ledgers may be posted back to the GL 362 the account level through accounting interface 361.

The general ledger 362 may be updated from the subsidiary ledger "inventories". The following postings may be posted from inventory accounting component 350 back to the GL 362 so that all postings necessary for proper closing are in GL 362. Specifically, the postings can include warehouse inventories, work-in-process inventories ("WIP"); and price differences. Updating GL 362 may take place at the account level through accounting interface 361 both synchronously and transaction-based during each goods movement posted in inventory accounting financial component 350.

Accounts for material inventories and WIP inventories are the same in financial component 360 and inventory accounting 350 and, thus, the posting may be transferred one-to-one from inventory accounting component 350 to financial component 360.

Activity allocations may be posted in inventory accounting component 350 as a primary posting (on account+cost element). However, for a secondary posting (i.e., inventory financial component 360), if it is not possible to update the Work in Process inventory account (balance sheet account), the posting may be transferred to GL 362 in exactly the same form. Therefore, an account may exist in GL 362 for the "allocated activities" cost element (=secondary cost element). To support this posting logic it may be possible to create financial component 360 accounts for secondary cost elements with overheads or activity allocation.

Overhead costs may also be posted primarily in inventory accounting component 350. Financial component 360 may be updated through accounting interface 361. However, this may mean that the overhead costs may be posted under a secondary cost element and a matching financial component 360 account.

Material ledger functions may be divided up between MM component 310 and financial component 360 and a partial subsidiary ledger functionality may be implemented in inventory accounting component 350, for example, a new subsidiary ledger for materials. In this new subsidiary ledger, the balance sheet item inventories may be displayed broken down into sub-items. The subsidiary ledger may consist of several sub items including, for example, raw materials and supplies, trading goods, goods produced in-house (semi finished products and finished products), and work in process. Lean inventory management engine 340 may provide the logistical inventory management function to update all material inventories and inventory-relevant goods movements in the logistical UOM and in the valuation UOM. Goods movements that are relevant to valuation may be transferred to inventory accounting component 350 in the valuation UOM. In the new subsidiary ledger Inventories, the movements may be valued and the financial documents may be generated. Inventory accounting component 350 may recognize only the quantity in the valuation UOM since movements and inventories may be valued at standard price. Although in the present embodiment, embodiments are contemplated in which the moving average price may be supported.

In MM component 310 only standard prices may be used for all materials, even non-catch-weight materials. Price control may be equal to standard price for all material types and it is generally not possible to change the price control. In general, valuation may be based on the material/plant level and split valuation and valuation at the batch level may not be supported. However, embodiments of the present invention are contemplated in which split valuation and valuation may be supported at the batch level. Production orders and process orders in general ledger 362 may be used as logistical objects and to calculate and store planned costs. All actual postings may be done in the financial components and may never be posted in the general ledger 362 production or process orders. For each production/process order there may be an additional object in the financial component to collect the actual costs. It may be important to hide some financials-relevant fields in order to prevent period-end closing activities (WIP, variances) from being carried out in general ledger 362. Period-end closing for production orders and process orders may be triggered and executed in financial component 360. New order types with the corresponding settings may be created and all other order types may be deleted.

Goods receipt for purchase orders may be valued at standard price (e.g., stock and GR/IR posting at standard price). The goods receipt may be valued in inventory accounting component 350 and may be subsequently posted through accounting interface 361 in real-time (transaction-based) general ledger 362.

Invoice verification may remain in general ledger 362 logistics invoice verification since the goods receipt may be posted in the financial component 350 and invoice verification may assume that no GR for the purchase order has taken place (=invoice receipt before goods receipt). Invoice verification may therefore post the complete invoiced amount (excluding taxes) to the GR/IR account 358. Invoices may not be blocked just because of the posting logic "invoice receipt before goods receipt" or because the goods receipt posting is not valued in general ledger 362. Direct postings to material accounts may not be supported in invoice verification.

In standard general ledger processing, for purchase orders with no quantity differences between goods receipt and invoice receipt, the balance on the GR/IR account 358 may be automatically balanced to zero when the goods receipt and invoice receipt are posted. Quantity differences between goods receipt and invoice receipt may result in a balance on a GR/IR clearing account. If no more goods or invoices for the purchase order are received, the balance may be cleared manually. The clearing may be done, for example at the end of a period or fiscal year.

As an embodiment of the present invention, the catch-weight system may have a different logic, specifically:

1. The goods receipt posting may offset the total stock value to GR/IR account 358. This posting may be made in inventory accounting component 350 and transferred to general ledger 362.
2. Invoice verification may post the total invoiced amount (excluding taxes) to GR/IR 358 the general ledger and in Inventory Accounting, while payables may only be posted in the general ledger.
3. GR/IR settle may periodically balance GR/IR 358 to zero for cleared ordering transactions. The balance of the GR/IR 358 account may be offset with purchase price differences. The differences between standard price and invoiced price (=purchase price variances) may be posted to a price difference account (a separate price difference account for each valuation class is possible).
4. With purchase orders for which no automatic clearing of the GR/IR 358 account is possible due to quantity differences between goods receipt and invoice, the balance on the GR/IR 358 account may still be cleared manually.

All goods movements may be posted from the inventory management component 340 to inventory accounting 350. Nevertheless, there are still material-based postings that may still be posted directly in GL 362, for example, invoice verification. To ensure a homogeneous and coordinated solution, the "account determination" may operate on the basis of the settings in GL 362. That is, the valuation class may still be maintained in material management component 310, and the assignment of accounts to transactions may be configured to be in material management component 310.

Standard prices may only be changed after a cost estimate has been released, and inventory cost estimates and price calculations for balance sheet valuation purposes (first-in, first-out ("FIFO"), last-in, first-out ("LIFO"), lowest value, etc.) may not be supported for catch-weight materials or for non-catch-weight materials. However, embodiments are contemplated in which balance sheet valuations may be supported.

In GL 362, material consumptions, activities, and overhead may be posted to the production order or process order as actual costs. During period end closing, WIP information 356 may be allocated from the order to WIP cost elements or accounts. In the financial component, material consumption may be posted directly from the material stock to the work-in-process inventory as an accounting exchange on the assets side. Activity consumption and overhead may also be posted directly as work in process. The benefits of this solution may include:

Having the value of the work in process reported to always be current (any variances are reported as work in process until the period-end close);

Needing only the period-end closing activity WIP calculation, to correct and cancel the WIP inventory; and Reposting from order costs to WIP is not necessary.

Inventories of stock materials and work in process may be listed together in inventory accounting component 350.

The plan price may be set manually and may be calculated iteratively by GL 362. The planned prices may be calculated in accordance with planned activity types for each cost center and activity type by dividing the planned costs by the planned activity quantity. Revaluation of the posted actual activity flows with changed plan prices may not be supported in the present embodiment. However, alternative embodiments are contemplated in which revaluation may be supported. In actual price determination, the system may calculate the prices iteratively for activity type on the basis of actual costs and actual activity quantities. Although revaluation of the posted actual activity flows with actual prices is not supported in the present embodiment, alternative embodiments are contemplated in which revaluation is supported.

Activity allocations and overhead may be posted in the inventory accounting component 350. The work-in-process inventory may be debited and the cost centers may be credited accordingly. Accounts and primary cost elements may be used both for posting to the work-in-process inventory and for the posting "internal activities." Activity allocations may be posted to GL 362 through a standard interface, for example, accounting interface 361, which ensures that Cost Center Accounting is updated correctly. The activity quantity may be updated to the general ledger line items in addition to the cost center and the activity type. The activity allocation may still be posted with a secondary cost element, since updating the output quantity to the cost center is only possible with secondary cost elements. If the output quantity on the cost center were not posted, it would not be possible to calculate actual prices. For overheads the following posting logic may be used: debit WIP (balance sheet account) and credit cost center (secondary cost element with account).

Activity allocations within CO-OM 369 on cost centers or internal orders may be posted with standard GL transactions and only updated in GL 362. In general, activity allocations may only be posted on production orders with the confirmation transaction in Production Planning and Control/Production Planning for Process Industries ("PP/PP-PI").

Although updating of commitments is not supported, alternative embodiments are contemplated in which it may be supported.

The complete internal order functionality may remain in GL 362, with only small constraints, for example, no commitments on internal orders, and no WIP calculation for internal orders.

Product cost planning component ("CO-PC-PCP") 367 may be used in the catch-weight system. Cost estimates may be created based on quantities in valuation UOM. To recalculate from the base UOM to the valuation UOM, the planned conversion factors from material management component 310 may be used. The GL 362 cost estimated with quantity structure may be used without any restrictions, and it may also be used to create raw material cost estimates. However, moving average, tax and commercial prices may or may not be available depending on the implementation. The costing lot size (in material management component 310) may be maintained in the valuation UOM. Overheads may be calculated using the costing sheet, but template calculations may or may not be supported.

Planned scrap may be specified in the logistical structures (Bill of Materials ("BOM"), material master, or routing) and the following types of scrap may be supported in product cost planning:

Component scrap: this may increase the requirement quantity of a component and maybe specified in the material master of the component or in the BOM.

Assembly scrap: this may increase the requirement quantity of all components and may be specified in the material master of the assembly.

Operation scrap: this may decrease the operation quantity of subsequent operations and may be definition in routing.

By-products may be valued with a fixed price to reduce the cost of the primary product (or of the cost estimate). In the BOM of the leading co-product, the by-product maybe listed with a negative quantity. A fixed price for the by-product may be specified in the material master. The negative quantity in the BOM may be valued with this price. For product cost planning it is also possible to apportion the total cost across multiple co-products based on equivalence numbers. The apportionment structure may be maintained in material management component 310. If it is not possible to split actual costs to the different co-products, actual cost posting and reporting may always be on the leading co-product. Preliminary settlement may or may not be supported.

Since all material-based processes in GL Cost Object Controlling use the base UOM, separate financial components for the catch-weight solution are needed. In general, GL Cost Object Controlling ("CO-PC-OBJ") may not be used in the catch-weight system, including not even for non-catch-weight materials.

Preliminary costing may be done using the GL 362 functionality and planned costs may be stored on GL 362 production or process orders.

The financial component quantities may only updated in the valuation UOM. Actual costs (or work in process) maybe posted when materials are consumed for orders or when production activities are confirmed. The consumption of materials in the production process (i.e., goods issue for order) may be entered in two UOMs (e.g., pieces and kilograms). The quantities in the valuation UOM may be used for the update of work in process in inventory accounting component 350. If the material consumption is entered in the base UOM only, the quantity in the valuation UOM may be calculated using the planned conversion factor in material management component 310. For production back flushes, a direct activity allocation that debits the WIP inventory 356 and credits the cost center may be posted in the inventory accounting component 350. Overhead may be allocated based on quantities or as a percentage of the direct costs. When the overhead is allocated, WIP inventory 356 may be debited and the cost center may be credited (primary posting, since relevant to inventory). Actual overhead costs may be calculated in each period. When goods receipts (GR) are entered, work-in-process inventory 356 may be transferred to the warehouse stock. This posting may be based on the GR quantity in the valuation UOM and may be valued using the standard price of the material being manufactured.

By-products may be entered in the BOM as material items with a negative quantity and a fixed price may be entered in the system for all by-products. Goods receipts for by-products may also result in a reposting of WIP to warehouse stock. This posting may be valued with the fixed price of the by-product. In such a case, preliminary settlement for joint production may not be supported; however, this case is merely an exemplary embodiment, as it is contemplated that preliminary settlement may be supported, as discussed above.

Since WIP inventory 356 may be updated directly with all consumption for production orders or process orders, only a periodic run to correct and adjust the WIP inventory 356 may be needed. This run may be triggered and executed in inventory accounting component 350 and repost the variances in WIP inventory 356 to a price difference account (P&L account). The closing process may cancel the WIP for certain orders, for example, orders that may have the status "final delivery", "technically completed", or "completed for business". Although, variances may not be calculated in GL 362 target costs for all standard GL 362 target cost versions may be calculated. These target costs may be transferred to a data warehouse and in combination with the actual cost information the data warehouse may define a variance reporting in the data.

Actual scrap postings may or may not be possible, since confirmations for the order or at the last operation of the order may only specify the yield. After a quality check, yield may be re-posted to a material number for B goods by means of a material-to-material transfer posting, if necessary. The standard price for B materials may be specified manually. Similarly, although rework may or may not be supported.

Sales orders may not have a CO object (this applies to both make-to-stock and make-to-order production), which means that no postings on sales orders may be possible. Therefore, planned costs may not be calculated for sales orders and sales orders may not be costed. There may be only one standard price for each material/plant combination. Sales order stocks may be valued with this standard price, although it is contemplated that sales orders may have a CO object to permit postings on sales orders.

Profit center accounting may be done in GL 362. For all the postings done in the inventory accounting component 350, profit centers may be derived similar to the GL 362 logic for: materials inventory from material master; work in process from process or production order to profit center from the produced material; material consumptions for cost centers or internal orders from cost center or order master; and activity allocations and overheads from cost center master and order. It is contemplated that transfer prices may and/or may not be supported.

Since the sales order may not have a CO object, there may be no make-to-order production with a CO object.

Billing may be based on the value for different UOMs. However, the primary UOM may be the weight (i.e., the valuation UOM) and a condition for the consumption price may be updated with the value from the goods issue or the standard price. There may be no valuation of material movements in GL 362 and no standard price in GL 362. In general, all material valuation may take place in the inventory accounting component 350. At the time of billing, the total cost of sales may be available in CO-PA 368. To supply CO-PA 368 with detailed information on the cost of goods sold, it may be possible to transfer the cost component split from product cost planning 367 to CO-PA 368. This may require transferring the quantity sold in valuation UOMs from the billing document to CO-PA 368.

Profitability analysis may be handled by CO-PA 368 and costing-based profitability analysis may be supported in inventory accounting component 350.

The valuation UOM may be relevant for results reporting (e.g., kilograms or tons). Sales delivery component 320 may send the valuation UOM to CO-PA 368, both on the sales order and on the billing document. An SD quantity field may send the same UOM to CO-PA (that is, either the valuation UOM or always the base UOM).

As an exemplary embodiment, the following information from billing element 323 may be sent to CO-PA 368: quantities; revenues; sales deductions; and cost of sales ("COS"). The cost of goods manufactured (with cost component split) may be transferred from CO-PCP-CP 367 to CO-PA 368. In GL 362, overhead may be transferred from GL 362 Cost Center Accounting to CO-PA 368. In general, production variances may not be transferred to CO-PA 368.

Further, the general evaluation level may be on the characteristics, i.e., for example, division, customer group, product/product group. In addition, third-party business transactions may not be supported in CO-PA 368 for the catch-weight system.

Further, financial component 360 standard reporting may not be used in the following areas because the data in financial component 360 that may be reported is only updated in inventory accounting component 350, including inventory reporting with valued inventories and cost object controlling.

Several embodiments of the present invention are specifically illustrated and described herein. However, it will be appreciated that modifications and variations of the present invention are covered by the above teachings and come within the purview of the appended claims without departing from the spirit and intended scope of the invention.

What is claimed is:

1. A method comprising:
   storing an inventory management record, in a database, relating to a product in inventory, the inventory management record storing a pair of values representing total quantity of the product at a common time, the first value representing total product quantity according to a logistical unit of measure for inventory control, the second value representing total product quantity according to a valuation unit of measure, wherein the first and second values are related to each other according to a variable conversion factor between them;
   responsive to an order, received at a computer running a catch-weight management program, for a quantity of the product, the order identifying the quantity according to the valuation unit of measure:
      converting the identified order quantity to a second quantity in the logistical unit of measure based on an estimated conversion factor between the logistical unit of measure and the valuation unit of measure;
      verifying availability of the second quantity of the product from an inventory control database;
      receiving a measurement in the valuation unit of measure of an actual amount of the second quantity of the product selected to fill the order;
      determining whether any of the product remains after the actual amount of the second quantity is deducted from the inventory to fill the order, based on a difference between the first value and the second quantity, and updating the inventory management record to include a new pair of values, wherein if there is product remaining, the new first value reflecting the difference between the first value and the second quantity, the new second value reflecting a difference between the second value and the received measurement, and if there is no product remaining, both new values indicating there is no more product in inventory;
      computing a valuation of the actual amount of the second quantity based on the received measurement.

2. The method according to claim 1, further comprising:
prior to deducting the actual amount of the second quantity from the inventory, computing an overall valuation of the total quantity of the product based on the second value; and
after computing the valuation of the actual amount of the second quantity, deducting the valuation of the actual amount of the second quantity from the overall valuation.

3. The method according to claim 1, further comprising: generating a billing document based on the valuation of the actual amount of the second quantity.

4. The method according to claim 1, wherein the logistical unit of measure is one of:
each,
a case,
a box, and
a pallet; and
the valuation unit of measure is one of:
a mass,
a weight,
a size,
a length, and
a volume.

5. A machine-readable medium having stored thereon a plurality of executable instructions to perform a method comprising:
storing an inventory management record, in a database, relating to a product in inventory, the inventory management record storing a pair of values representing total quantity of the product at a common time, the first value representing total product quantity according to a logistical unit of measure for inventory control, the second value representing total product quantity according to a valuation unit of measure, wherein the first and second values are related to each other according to a variable conversion factor between them;
responsive to an order for a quantity of the product, the order identifying the quantity according to the valuation unit of measure:
converting the identified order quantity to a second quantity in the logistical unit of measure based on an estimated conversion factor between the logistical unit of measure and the valuation unit of measure;
verifying availability of the second quantity of the product from an inventory control database;
receiving a measurement in the valuation unit of measure of an actual amount of the second quantity of the product selected to fill the order;
determining whether any of the product remains after the actual amount of the second quantity is deducted from the inventory to fill the order, based on a difference between the first value and the second quantity, and updating the inventory management record to include a new pair of values, wherein if there is product remaining, the new first value reflecting the difference between the first value and the second quantity, the new second value reflecting a difference between the second value and the received measurement, and if there is no product remaining, both new values indicating there is no more product in inventory;
computing a valuation of the actual amount of the second quantity based on the received measurement.

6. The machine-readable medium according to claim 5, the method further comprising:
prior to deducting the actual amount of the second quantity from the inventory, computing an overall valuation of the total quantity of the product based on the second value; and
after computing the valuation of the actual amount of the second quantity, deducting the valuation of the actual amount of the second quantity from the overall valuation.

7. The machine-readable medium according to claim 5, the method further comprising:
generating a billing document based on the valuation of the actual amount of the second quantity.

8. The machine-readable medium according to claim 5, wherein the logistical unit of measure is one of:
each,
a case,
a box, and
a pallet; and
the valuation unit of measure is one of:
a mass,
a weight,
a size,
a length, and
a volume.

* * * * *

UNITED STATES PATENT AND TRADEMARK OFFICE
CERTIFICATE OF CORRECTION

PATENT NO. : 7,664,684 B2 Page 1 of 1
APPLICATION NO. : 10/940658
DATED : February 16, 2010
INVENTOR(S) : Boerner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1554 days.

Signed and Sealed this

Thirtieth Day of November, 2010

David J. Kappos
*Director of the United States Patent and Trademark Office*